US011341327B2

(12) United States Patent
Asano et al.

(10) Patent No.: US 11,341,327 B2
(45) Date of Patent: May 24, 2022

(54) SCORE GENERATION FOR RELATIONSHIPS BETWEEN EXTRACTED TEXT AND SYNONYMS

(71) Applicant: HITACHI, LTD., Tokyo (JP)

(72) Inventors: Yu Asano, Tokyo (JP); Makoto Iwayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 151 days.

(21) Appl. No.: 16/818,135

(22) Filed: Mar. 13, 2020

(65) Prior Publication Data

US 2021/0089715 A1 Mar. 25, 2021

(30) Foreign Application Priority Data

Sep. 20, 2019 (JP) ............................. JP2019-171363

(51) Int. Cl.

| | |
|---|---|
| ***G06F 40/247*** | (2020.01) |
| ***G06F 40/279*** | (2020.01) |
| ***G06F 16/332*** | (2019.01) |
| ***G06F 40/30*** | (2020.01) |
| ***G06F 40/242*** | (2020.01) |

(52) U.S. Cl.

CPC ........ *G06F 40/247* (2020.01); *G06F 16/3329* (2019.01); *G06F 40/242* (2020.01); *G06F 40/279* (2020.01); *G06F 40/30* (2020.01)

(58) Field of Classification Search

CPC .... G06F 40/237; G06F 40/247; G06F 40/279; G06F 40/284; G06F 40/30; G06F 16/3329; G06N 20/00

USPC .................................... 704/1, 9, 10; 707/748

See application file for complete search history.

(56) References Cited

U.S. PATENT DOCUMENTS

| | | | | |
|---|---|---|---|---|
| 8,762,370 | B1 * | 6/2014 | Grushetskyy | G06F 40/247 704/9 |
| 9,400,838 | B2 * | 7/2016 | Musgrove | G06F 40/247 |
| 10,489,393 | B1 * | 11/2019 | Mittal | G06F 16/3329 |
| 11,055,355 | B1 * | 7/2021 | Monti | G06F 16/3329 |
| 2010/0313258 | A1 * | 12/2010 | Chaudhuri | G06F 40/247 726/9 |
| 2013/0006975 | A1 * | 1/2013 | Li | G06F 40/247 707/723 |

(Continued)

FOREIGN PATENT DOCUMENTS

JP 2018-197924 A 12/2018

*Primary Examiner* — Martin Lerner
(74) *Attorney, Agent, or Firm* — Volpe Koenig

(57) ABSTRACT

An information processing device includes an input device, an output device, a processing device, a storage device, and a generating unit. The generating unit includes a first function of inputting text data; a second function of inputting a synonym dictionary including synonyms; a third function of extracting a first piece of text data from the multiple pieces of text data; a fourth function of extracting from the synonym dictionary synonyms in which a certain word in the first piece of text data is included; a fifth function of extracting from the text data second multiple pieces of text data including a synonym belonging to the extracted synonyms; and a sixth function of generating a score to evaluate a relationship between the first piece of text data and the extracted synonyms from a relationship between the first piece of text data and the second multiple pieces of text data.

9 Claims, 19 Drawing Sheets

(56) References Cited

U.S. PATENT DOCUMENTS

| | | | | |
|---|---|---|---|---|
| 2015/0227505 | A1* | 8/2015 | Morimoto | G06F 40/247 704/9 |
| 2016/0140958 | A1* | 5/2016 | Heo | G06F 40/30 704/9 |
| 2016/0148105 | A1* | 5/2016 | Henmi | G06F 40/30 706/11 |
| 2017/0116178 | A1* | 4/2017 | Kumar Rangarajan Sridhar | G06F 40/30 |
| 2017/0206453 | A1* | 7/2017 | Kaufmann | G06F 40/247 |
| 2017/0242915 | A1* | 8/2017 | Torisawa | G06F 16/3329 |
| 2018/0107654 | A1* | 4/2018 | Jung | G06F 40/247 |
| 2019/0095428 | A1* | 3/2019 | Asano | G10L 15/1822 |
| 2020/0104360 | A1* | 4/2020 | Gahlot | G06F 40/247 |
| 2020/0184992 | A1* | 6/2020 | Newell | G10L 15/1822 |
| 2020/0285808 | A1* | 9/2020 | Yoshida | G06F 40/247 |
| 2020/0327170 | A1* | 10/2020 | Boxwell | G06F 40/247 |
| 2020/0387668 | A1* | 12/2020 | Yokote | G06F 40/247 |

* cited by examiner

F I G. 2
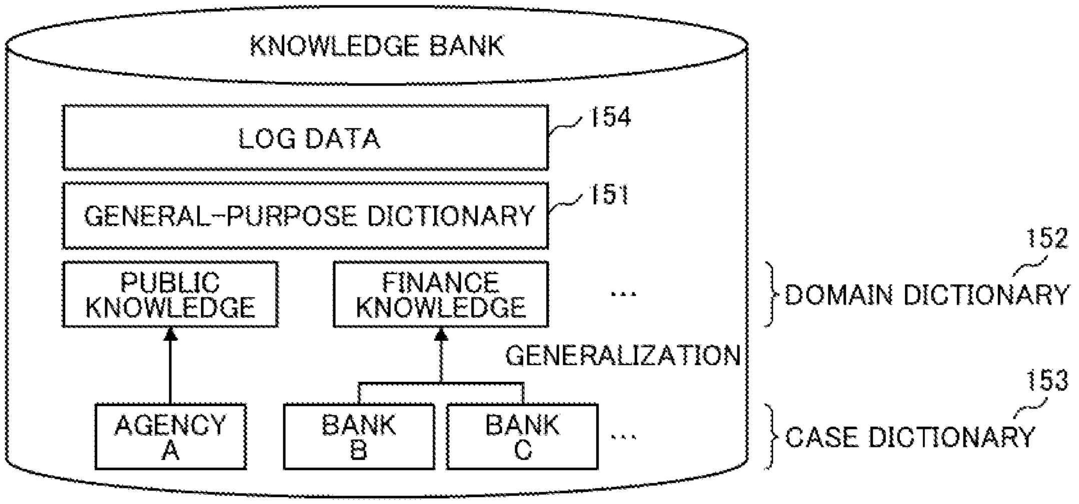
F I G. 3
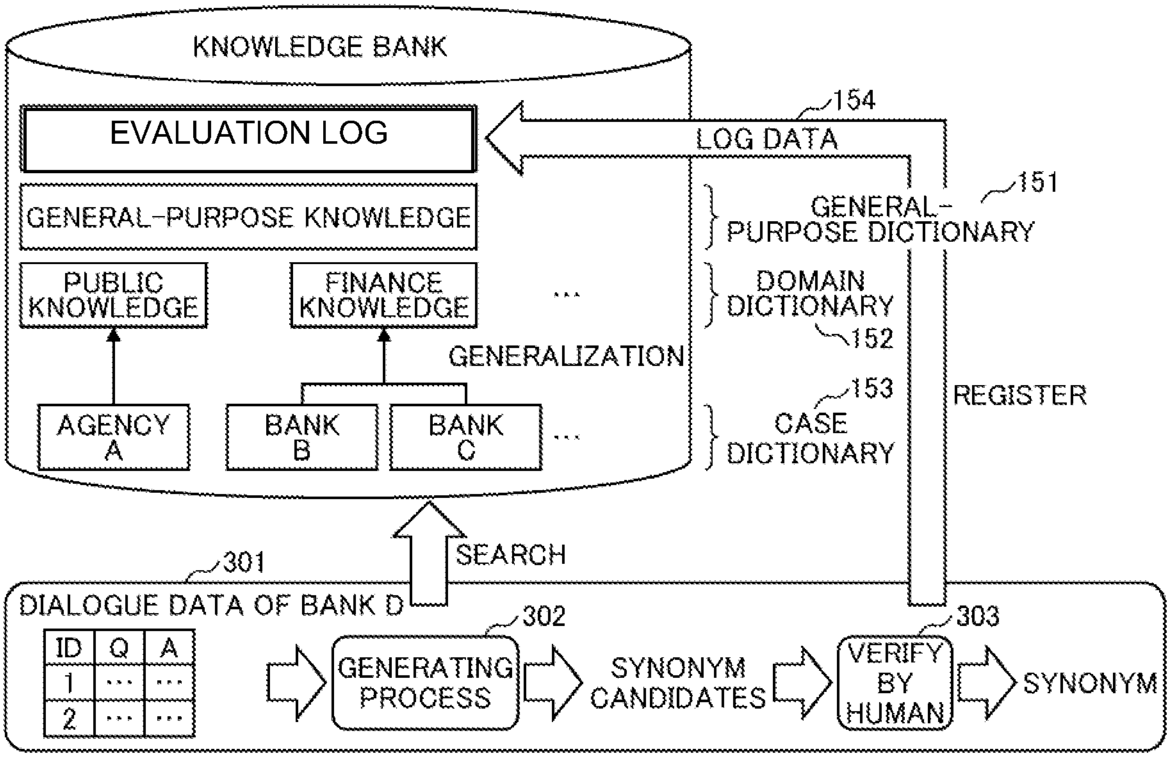

F I G. 4

301

| DIALOGUE ID | QUESTION TEXT | ANSWER TEXT |
|---|---|---|
| d1 | TELL ME WHERE <ELEVATOR> IS. | IT IS NEXT TO NORTH-SIDE RESTROOM ON EACH FLOOR. |
| | I WANT TO USE <ELEVATOR>. | |
| d2 | TELL ME WHERE BABY <LOUNGE> IS. | IT IS BESIDE THE THIRD FLOOR STAIRWAY. |

F I G. 5

152

| DOMAIN | HEADWORD | SYNONYM | | |
|---|---|---|---|---|
| FINANCE | <HOUSE> | HOUSE | HOME | RESIDENCE |
| FINANCE | <ELEVATOR> | ELEVATOR | ELEVATING MACHINE | LIFT |
| FINANCE | <LOUNGE> | LOUNGE | REST STATION | |
| FINANCE | <APPLICATION> | APPLICATION | NOTIFICATION | SUBMISSION |

F I G. 6

153

| DOMAIN | CASE | HEADWORD | SYNONYM | | |
|---|---|---|---|---|---|
| PUBLIC | AGENCY A | <HOUSE> | HOUSE | HOME | RESIDENCE |
| PUBLIC | AGENCY A | <ELEVATOR> | ELEVATOR | ELEVATING MACHINE | LIFT |
| PUBLIC | AGENCY A | <LOUNGE> | LOUNGE | REST STATION | |
| PUBLIC | AGENCY A | <APPLICATION> | APPLICATION | NOTIFICATION | SUBMISSION |

| DOMAIN |
|---|
| FINANCE |

⟨ELEVATOR⟩

| WORD | EVALUATION |
|---|---|
| ELEVATOR | True |
| ELEVATING MACHINE | True |
| FACILITY | False |
| | |
| | |

| QUESTION TEXT | ANSWER TEXT | DOMAIN | SCORE | EVALUATION |
|---|---|---|---|---|
| TELL ME WHERE ⟨ELEVATOR⟩ IS. | IT IS NEXT TO NORTH-SIDE RESTROOM ON EACH FLOOR | BANK D | 0.95 | |
| I WANT TO USE ⟨ELEVATOR⟩. | IT IS NEXT TO NORTH-SIDE RESTROOM ON EACH FLOOR | BANK D | 0.48 | |
| | | | | |
| | | | | |
| | | | | |

F I G. 8 A

154

| DICTIONARY (801) | TIME (802) | USER ID (803) | HEADWORD (804) | SYNONYM (805) | QUESTION TEXT (806) | ANSWER TEXT (807) | EVALUATION (808) | CLASSIFIED AS (809) |
|---|---|---|---|---|---|---|---|---|
| FINANCE | 2019/1/2 15:32:22 | 1123 | ELEVATOR | ELEVATOR | TELL ME WHERE <ELEVATOR> IS? | IT IS NEXT TO NORTH-SIDE RESTROOM ON EACH FLOOR. | True | APPLICATION |
| FINANCE | 2019/1/2 15:32:22 | 1123 | ELEVATOR | ELEVATOR | I WANT TO USE <ELEVATOR>? | IT IS NEXT TO NORTH-SIDE RESTROOM ON EACH FLOOR. | True | APPLICATION |
| FINANCE | 2019/1/2 15:32:22 | 1123 | ELEVATOR | ELEVATING MACHINE | TELL ME WHERE <ELEVATOR> IS? | IT IS NEXT TO NORTH-SIDE RESTROOM ON EACH FLOOR. | True | APPLICATION |
| FINANCE | 2019/1/2 15:32:22 | 1123 | ELEVATOR | ELEVATING MACHINE | I WANT TO USE <ELEVATOR>? | IT IS NEXT TO NORTH-SIDE RESTROOM ON EACH FLOOR. | True | APPLICATION |
| FINANCE | 2019/1/2 15:32:22 | 1123 | ELEVATOR | FACILITY | TELL ME WHERE <ELEVATOR> IS? | IT IS NEXT TO NORTH-SIDE RESTROOM ON EACH FLOOR. | False | APPLICATION |
| FINANCE | 2019/1/2 15:32:22 | 1123 | ELEVATOR | FACILITY | I WANT TO USE <ELEVATOR>? | IT IS NEXT TO NORTH-SIDE RESTROOM ON EACH FLOOR. | False | APPLICATION |

F I G. 8 B

154

| DICTIONARY (801) | TIME (802) | USER ID (803) | HEADWORD (804) | SYNONYM (805) | QUESTION TEXT (806) | ANSWER TEXT (807) | EVALUATION (808) | CLASSIFIED AS (809) |
|---|---|---|---|---|---|---|---|---|
| FINANCE | 2019/7/10 15:12:42 | 9012 | APPLICATION | APPLICATION | WHAT PAPERWORK IS NECESSARY FOR <APPLICATION>? | PAPERWORK NECESSARY FOR APPLICATION IS IDENTIFICATION CERTIFICATE. | True | GENERALIZING |
| FINANCE | 2019/7/10 15:12:42 | 9012 | APPLICATION | APPLICATION | WHERE CAN I MAKE <APPLICATION>? | COUNTER NO. 1 WHERE YOU CAN MAKE APPLICATION. | True | GENERALIZING |
| FINANCE | 2019/7/10 15:12:42 | 9012 | APPLICATION | NOTIFICATION | WHAT PAPERWORK IS NECESSARY FOR <APPLICATION>? | PAPERWORK NECESSARY FOR APPLICATION IS IDENTIFICATION CERTIFICATE. | True | GENERALIZING |
| FINANCE | 2019/7/10 15:12:42 | 9012 | APPLICATION | NOTIFICATION | WHERE CAN I MAKE <APPLICATION>? | COUNTER NO. 1 WHERE YOU CAN MAKE APPLICATION. | True | GENERALIZING |
| FINANCE | 2019/7/10 15:12:42 | 9012 | APPLICATION | SUBMISSION | WHAT PAPERWORK IS NECESSARY FOR <APPLICATION>? | PAPERWORK NECESSARY FOR APPLICATION IS IDENTIFICATION CERTIFICATE. | False | GENERALIZING |
| FINANCE | 2019/7/10 15:12:42 | 9012 | APPLICATION | SUBMISSION | WHERE CAN I MAKE <APPLICATION>? | COUNTER NO. 1 WHERE YOU CAN MAKE APPLICATION. | False | GENERALIZING |

F I G. 8 C

154

| DICTIONARY (801) | TIME (802) | USER ID (803) | HEADWORD (804) | SYNONYM (805) | QUESTION TEXT (806) | ANSWER TEXT (807) | EVALUATION (808) | CLASSIFIED AS (809) |
|---|---|---|---|---|---|---|---|---|
| TAX | 2019/7/10 15:12:42 | 9012 | CAR REGISTRATION NUMBER | CAR REGISTRATION NUMBER | n/a | n/a | True | EXPANSION |
| TAX | 2019/7/10 15:12:42 | 9012 | CAR REGISTRATION NUMBER | NUMBER PLATE | n/a | n/a | True | EXPANSION |
| AUTOMOBILE | 2019/7/10 15:12:42 | 9012 | CAR REGISTRATION NUMBER | CAR REGISTRATION NUMBER | n/a | n/a | True | EXPANSION |
| AUTOMOBILE | 2019/7/10 15:12:42 | 9012 | CAR REGISTRATION NUMBER | NUMBER PLATE | n/a | n/a | True | EXPANSION |
| BANK | 2019/7/10 15:12:42 | 9012 | MY NUMBER | MY NUMBER | n/a | n/a | True | EXPANSION |
| BANK | 2019/7/10 15:12:42 | 9012 | MY NUMBER | PERSONAL NUMBER | n/a | n/a | True | EXPANSION |
| SECURITIES | 2019/7/10 15:12:42 | 9012 | MY NUMBER | MY NUMBER | n/a | n/a | True | EXPANSION |
| SECURITIES | 2019/7/10 15:12:42 | 9012 | MY NUMBER | PERSONAL NUMBER | n/a | n/a | True | EXPANSION |

F I G. 8 D

154

| DICTIONARY (801) | TIME (802) | USER ID (803) | HEADWORD (804) | SYNONYM (805) | QUESTION TEXT (806) | ANSWER TEXT (807) | EVALUATION (808) | CLASSIFIED AS (809) |
|---|---|---|---|---|---|---|---|---|
| BANK D | 2019/7/11 20:17:30 | 0023 | APPLICATION | APPLICATION | WHAT PAPERWORK IS NECESSARY FOR <APPLICATION>? | PAPERWORK NECESSARY FOR APPLICATION IS IDENTIFICATION CERTIFICATE. | True | APPLICATION |
| BANK D | 2019/7/11 20:17:30 | 0023 | APPLICATION | NOTIFICATION | WHAT PAPERWORK IS NECESSARY FOR <APPLICATION>? | PAPERWORK NECESSARY FOR APPLICATION IS IDENTIFICATION CERTIFICATE. | False | APPLICATION |
| BANK D | 2019/7/11 20:17:30 | 0023 | APPLICATION | SUBMISSION | WHAT PAPERWORK IS NECESSARY FOR <APPLICATION>? | PAPERWORK NECESSARY FOR APPLICATION IS IDENTIFICATION CERTIFICATE. | False | APPLICATION |
| BANK D | 2019/7/11 20:17:30 | 0023 | APPLICATION | DECLARATION | WHAT PAPERWORK IS NECESSARY FOR <APPLICATION>? | PAPERWORK NECESSARY FOR APPLICATION IS IDENTIFICATION CERTIFICATE. | True | APPLICATION |

F I G. 9
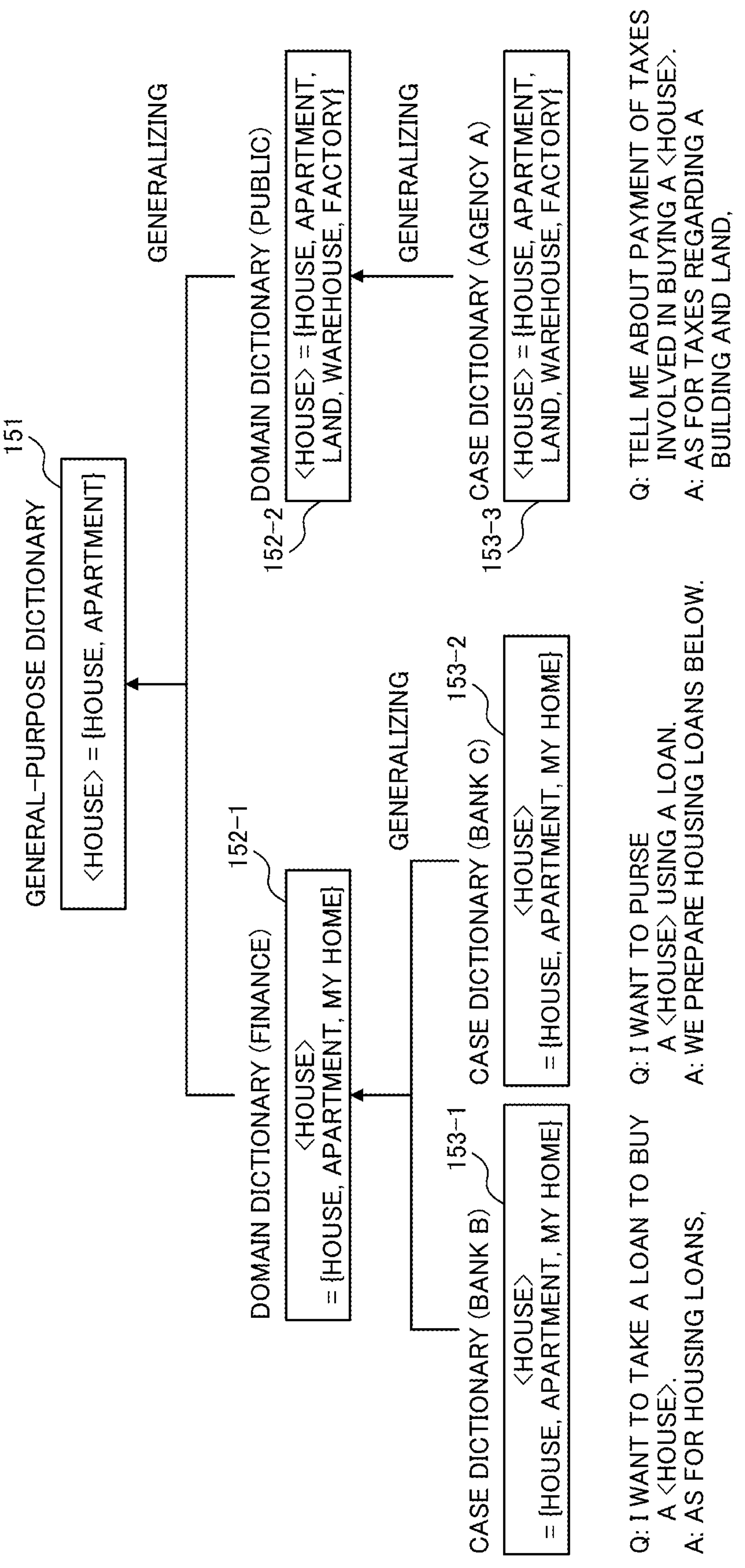

| HEADWORD (1101) | SYNONYM (1102) | EVALUATION RESULT (GENERAL) (1103) | EVALUATION RESULT (POSITIVE) (1104) | EVALUATION RESULT (NEGATIVE) (1105) | CASE (1106) | DOMAIN (1107) |
|---|---|---|---|---|---|---|
| <HOUSE> | HOUSE | True | 7 | 0 | BANK B | FINANCE |
| <HOUSE> | FACTORY | False | 1 | 6 | BANK B | FINANCE |
| <HOUSE> | HOME | True | 5 | 2 | BANK B | FINANCE |

| HEADWORD | SYNONYM | EVALUATION RESULT (GENERAL) | EVALUATION RESULT (POSITIVE) | EVALUATION RESULT (NEGATIVE) | CASE | DOMAIN |
|---|---|---|---|---|---|---|
| <HOUSE> | HOUSE | True | 7 | 0 | BANK C | FINANCE |
| <HOUSE> | FACTORY | True | 10 | 3 | BANK C | FINANCE |
| <HOUSE> | HOME | True | 4 | 1 | BANK C | FINANCE |

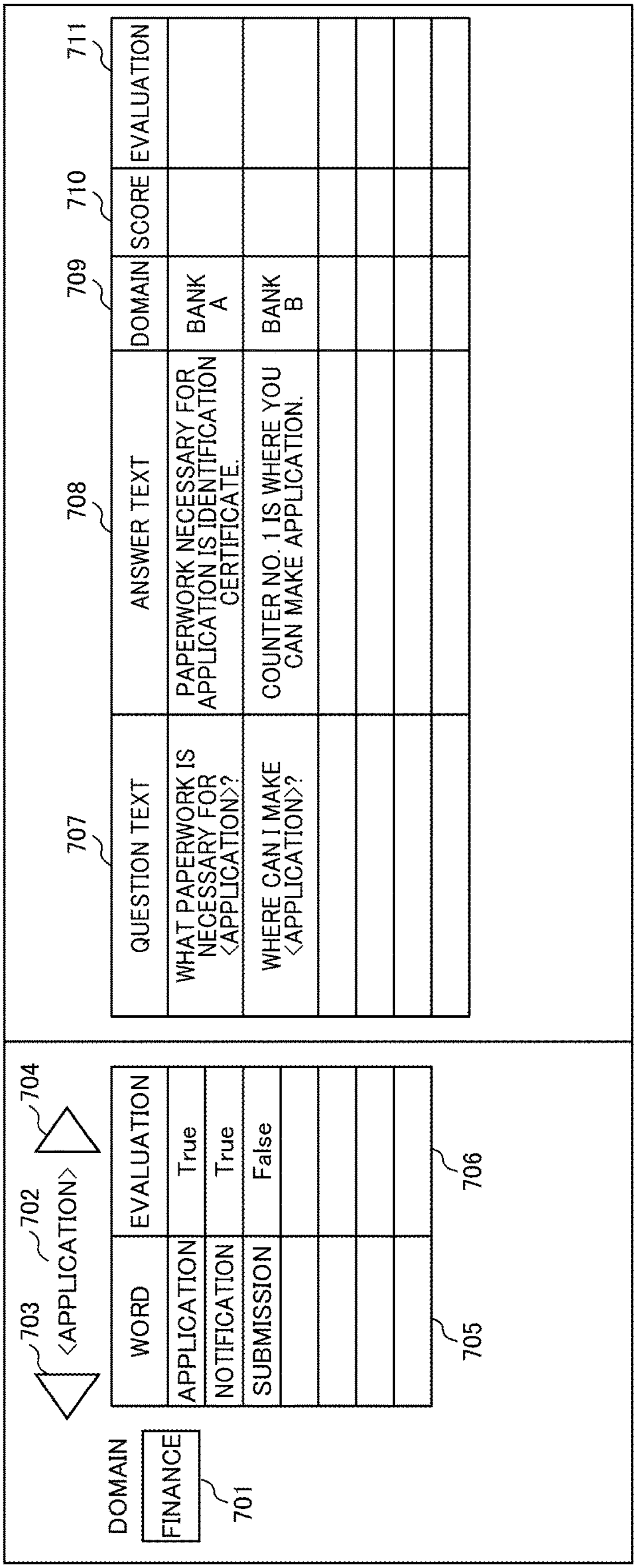

F I G. 12

| DOMAIN | | |
|---|---|---|
| FINANCE | | |

701

703 <APPLICATION> 702  704

| WORD | EVALUATION |
|---|---|
| APPLICATION | True |
| NOTIFICATION | True |
| SUBMISSION | False |
| | |
| | |

705  706

| QUESTION TEXT 707 | ANSWER TEXT 708 | DOMAIN 709 | SCORE 710 | EVALUATION 711 |
|---|---|---|---|---|
| WHAT PAPERWORK IS NECESSARY FOR <APPLICATION>? | PAPERWORK NECESSARY FOR APPLICATION IS IDENTIFICATION CERTIFICATE. | BANK A | | |
| WHERE CAN I MAKE <APPLICATION>? | COUNTER NO. 1 IS WHERE YOU CAN MAKE APPLICATION. | BANK B | | |
| | | | | |
| | | | | |
| | | | | |

152

| DOMAIN | HEADWORD | SYNONYM | |
|---|---|---|---|
| PUBLIC | <HOUSE> | HOUSE | HOME |
| PUBLIC | <ELEVATOR> | ELEVATOR | ELEVATING MACHINE |
| PUBLIC | <HOME> | HOME | RESIDENCE |

FIG. 15

| DOMAIN | HEADWORD | SYNONYM | | |
|---|---|---|---|---|
| PUBLIC | <HOUSE> | HOUSE | HOME | DWELLING |
| PUBLIC | <ELEVATOR> | ELEVATOR | ELEVATING MACHINE | |
| PUBLIC | <HOME> | HOME | RESIDENCE | |

FIG. 16

DIALOGUE DATA 1

| ID | QUESTION TEXT | ANSWER TEXT |
|---|---|---|
| 1 | q11 | a11 |
| ··· | ··· | ··· |
| i | q1i | a1i |
| ··· | ··· | ··· |
| n | q1n | a1n |

SYNONYM DATA RELEVANT TO DIALOGUE DATA 1

| HEADWORD | SYNONYM | |
|---|---|---|
| ··· | ··· | ··· |
| <e1> | syn11 | syn12 |
| ··· | ··· | ··· |

DIALOGUE DATA 2

| ID | QUESTION TEXT | ANSWER TEXT |
|---|---|---|
| 1 | q21 | a21 |
| ··· | ··· | ··· |
| j | q2j | a2j |
| ··· | ··· | ··· |
| m | q2m | a2m |

SYNONYM DATA RELEVANT TO DIALOGUE DATA 2

| HEADWORD | SYNONYM | |
|---|---|---|
| ··· | ··· | ··· |
| <e2> | syn11 | syn22 |
| ··· | ··· | ··· |

F I G. 1 7

| | DOMAIN | SYNONYM DEFINITION | QUESTION TEXT | ANSWER TEXT |
|---|---|---|---|---|
| 1 | TAX | NUMBER = CAR REGISTRATION NUMBER | I WANT TAX CERTIFICATE FOR <NUMBER> OF OTHER PREFECTURE. (Q1) | YOU CAN APPLY FOR A NUMBER THAT IS ONLY VALID WITHIN THE PREFECTURE APPLICABLE. PLEASE CONTACT THE PREFECTURE THAT YOU REGISTERED WITH ON APRIL 1ST IN THE YEAR WHEN YOU TOOK CAR INSPECTION. (A1) |
| 2 | AUTOMOBILE | NUMBER = NUMBER PLATE | WHAT IS NECESSARY WHEN CHANGING A DESIRED <NUMBER>? (Q2) | IN ADDITION TO CONTACT INFORMATION, INFORMATION ON CAR TYPE AND STATE, ETC. IS NECESSARY. (A2) |
| 3 | BANK | NUMBER = MY NUMBER | WHEN CHANGING THE ADDRESS OF MY ACCOUNT, IS <NUMBER> NECESSARY? (Q3) | TO CHANGE THE ADDRESS OF AN ACCOUNT, "MY NUMBER" OF WHICH RECEIPT WAS STARTED FROM OCTOBER, 2015 IS NECESSARY. (A3) |
| 4 | SECURITIES | NUMBER = PERSONAL NUMBER | WHEN CHANGING THE NAME OF MY ACCOUNT, IS <NUMBER> NECESSARY? (Q4) | TO CHANGE THE NAME OF AN ACCOUNT, PLEASE BRING A PROOF OF IDENTITY, SUCH AS A LICENSE OR MY NUMBER CARD. (A4) |

FIG. 18

| SIMILARITY DEGREE BETWEEN QS | | SIMILARITY DEGREE BETWEEN A'S | | SYNONYM DETERMINATION |
|---|---|---|---|---|
| Q1-Q2 | LOW | A1-A2 | HIGH | ○ |
| Q1-Q3 | LOW | A1-A3 | LOW | × |
| Q1-Q4 | LOW | A1-A4 | LOW | × |
| Q2-Q3 | HIGH | A2-A3 | LOW | × |
| Q2-Q4 | HIGH | A2-A4 | LOW | × |
| Q3-Q4 | HIGH | A3-A4 | HIGH | ○ |

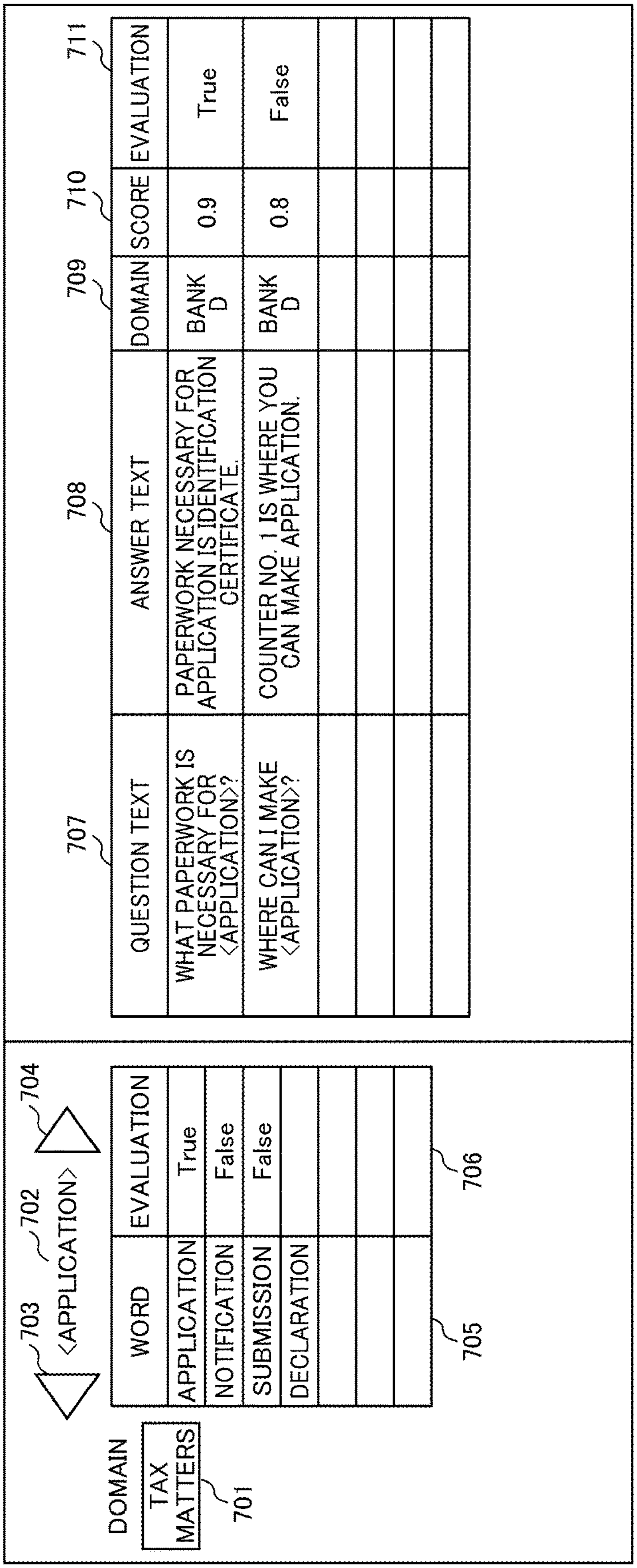

F I G. 2 1

| DOMAIN | | | |
|---|---|---|---|
| TAX MATTERS | | | |

▽ <APPLICATION> △

| WORD | EVALUATION |
|---|---|
| APPLICATION | True |
| NOTIFICATION | False |
| SUBMISSION | False |
| DECLARATION | |
| | |

| QUESTION TEXT | ANSWER TEXT | DOMAIN | SCORE | EVALUATION |
|---|---|---|---|---|
| WHAT PAPERWORK IS NECESSARY FOR <APPLICATION>? | PAPERWORK NECESSARY FOR APPLICATION IS IDENTIFICATION CERTIFICATE. | BANK D | 0.9 | True |
| WHERE CAN I MAKE <APPLICATION>? | COUNTER NO. 1 IS WHERE YOU CAN MAKE APPLICATION. | BANK D | 0.8 | False |
| | | | | |
| | | | | |
| | | | | |

SCORE GENERATION FOR RELATIONSHIPS BETWEEN EXTRACTED TEXT AND SYNONYMS

TECHNICAL FIELD

The present invention relates to a knowledge database (DB) for use in a natural language dialogue system or the like.

BACKGROUND OF THE INVENTION

In recent years, it is attempted to aid existing staff tasks using a dialogue system to help attendants in facilities such as airports and stations who are required to respond in various languages and interpersonal services such as over-the-counter services at banks and local governments which handle complicated services. As a concrete example, putting a dialogue system with a robot, a voice assistant, or the like in practical use is underway to aid service businesses which become more sophisticated.

To realize a dialogue system that is able to answer to diverse utterances made by users, it is needed to prepare a knowledge DB for making a dialogue in advance. In most cases, generating a knowledge DB has so far been performed manually and its cost becomes a problem.

For example, suppose that, to make an answer about operating hours of a shop, a question and answer pair is prepared in which the question is "tell me operating hours" and the answer is "the operating hours are from 10 am to 8 pm". However, there is a possibility being asked by users in various ways of saying such as "I want to know selling hours" or "I want to hear about open hours" and the dialogue system is required to able to respond to these ways of saying.

So far, existing dialogue systems have performed knowledge upgrading by using existing synonym and paraphrase dictionaries or creating proprietary dictionaries. Because upgrading such dictionaries for each case is costly, a method is sought to increase synonyms and paraphrases efficiently.

For example, Japanese Unexamined Patent Application Publication No. 2018-197924 discloses an information processing device that dialogs with a user by outputting an answer to a question made by the user in order to make it possible to make a dialogue without preparing large-scale paraphrase text data. This device includes an input unit which accepts a question and a dialogue control unit which selects an answer candidate to a question accepted by the input unit during a dialogue out of candidate data, executes a confirmation process of asking the user to confirm whether or not wording that paraphrases the question is appropriate, and, based on a result of the confirmation, registers the candidate as a paraphrase for the question.

SUMMARY OF THE INVENTION

In Japanese Unexamined Patent Application Publication No. 2018-197924, a method is proposed in which a dialogue system autonomously makes a confirmation with a user to learn knowledge such as synonyms and paraphrases necessary for answering a question to which it is unable to answer, based on dialogue logs. For example, if it is unknown whether or not a "sucking room" and a "baby room" are synonyms, the system asks a user a question "Are a "sucking room" and a "baby room" synonyms?" If they are synonyms as the user's answer to this question, the synonyms are added. It is possible to upgrade knowledge by making a confirmation with a user about an unknown point in this way. To extract a synonym candidate, a similarity degree between user utterance text and a question and answer pair registered is used.

Although one method of knowledge expansion is proposed in Japanese Unexamined Patent Application Publication No. 2018-197924, it is impossible to determine whether or not certain words are synonyms or paraphrases unless a user answers a question in a use environment. In addition, when extracting a synonym candidate or a paraphrase candidate from a dialogue log, a similarity degree between user utterance and a question and answer pair is used; however, it is required to further improve extraction accuracy.

Therefore, a technology is sought to expand a knowledge DB automatically and accurately.

One preferable aspect of the resent invention is an information processing method that is executed by an information processing device including an input device, an output device, a processing device, a storage device, and a generating unit. The generating unit executes a first step of inputting multiple pieces of text data; a second step of inputting a synonym dictionary including multiple sets of synonyms; a third step of extracting a first piece of text data from the multiple pieces of text data; a fourth step of extracting from the synonym dictionary a set of synonyms in which a certain word in the first piece of text data is included; a fifth step of extracting from the multiple pieces of text data second multiple pieces of text data including a synonym belonging to the extracted set of synonyms; and a sixth step of generating a score to evaluate a relationship between the first piece of text data and the extracted set of synonyms from a relationship between the first piece of text data and the second multiple pieces of text data.

Another preferable aspect of the resent invention is an information processing device including an input device, an output device, a processing device, a storage device, and a generating unit. The generating unit includes a first function of inputting multiple pieces of text data; a second function of inputting a synonym dictionary including multiple sets of synonyms; a third function of extracting a first piece of text data from the multiple pieces of text data; a fourth function of extracting from the synonym dictionary a set of synonyms in which a certain word in the first piece of text data is included; a fifth function of extracting from the multiple pieces of text data second multiple pieces of text data including a synonym belonging to the extracted set of synonyms; and a sixth function of generating a score to evaluate a relationship between the first piece of text data and the extracted set of synonyms from a relationship between the first piece of text data and the second multiple pieces of text data.

It is possible to expand a knowledge DB automatically and accurately.

BRIEF DESCRIPTION OF THE DRAWINGS

FIG. 2 is a conceptual diagram depicting a hierarchical structure of knowledge which is stored in the knowledge bank;

FIG. 3 is a conceptual diagram depicting an example of use of the knowledge bank;

FIG. 4 is a table diagram representing an example of dialogue data;

FIG. 5 is a table diagram representing an example of a synonym list in a domain dictionary;

FIG. 6 is a table diagram representing an example of a synonym list in a case dictionary;

FIG. 8A is a table diagram representing one example of a data form which is recorded in log data;

FIG. 8B is a table diagram representing one example of a data form which is recorded in log data;

FIG. 8C is a table diagram representing one example of a data form which is recorded in log data;

FIG. 8D is a table diagram representing one example of a data form which is recorded in log data;

FIG. 9 is a conceptual diagram of a generalizing process by extracting an intersection;

FIG. 11 is a table diagram to explain the concept of aggregation;

FIG. 12 is an example of an input screen which is displayed for evaluation on the display device of the input/output device;

FIG. 15 is a table diagram representing another example of a domain dictionary of public knowledge;

FIG. 16 is a table diagram representing examples of first dialogue data, second dialogue data, synonym data relevant to first dialogue data, and synonym data relevant to second dialogue data;

FIG. 17 is an explanatory table diagram indicating that a similarity degree between answer texts is more correlated to a determination of whether or not words are synonyms than a similarity degree between question texts;

FIG. 18 is a table diagram representing a relationship among a similarity degree between question texts, a similarity degree between answer texts, and synonym determination;

FIG. 21 is a diagram of a screen in which a result of the application process is displayed for evaluation by user on the input/output device.

DETAILED DESCRIPTION

Figure 1:
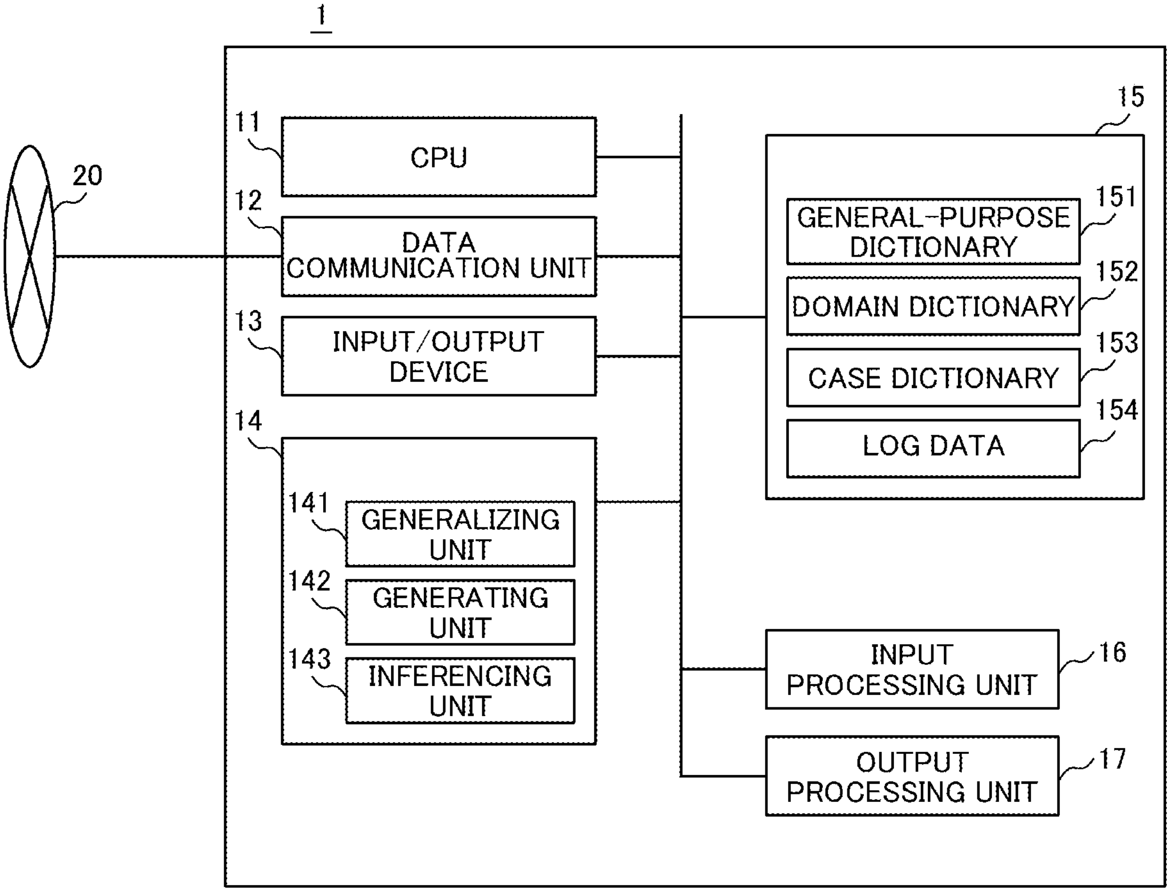
FIG. 1 is a hardware configuration block diagram of a knowledge bank.

In the following, embodiments will be described in detail with the aid of the drawings. However, the present invention should not be construed to be limited to the described contents of the embodiments set forth hereinafter. Those skilled in the art will easily appreciate that a concrete configuration of the present invention may be modified without departing from the idea or spirit of the invention.

*P

In a configuration of the present invention, which will be described hereinafter, to identify same components or components having a same function, same reference numerals are used in common across different drawings, and duplicated description may be omitted.

When multiple elements having a same or similar function exist, they may be identified in a description regarding them by using a same reference numeral with different subscripts. However, when it is not needed to identify the multiple elements, a description regarding them may be provided without using the subscripts.

Notation of "first", "second", "third", etc. herein is affixed to identify components, but it is not necessarily intended to qualify a number, a sequence, or its content. In addition, numbers to identify components are used a per-context basis and a number used in one context does not always denote the same component in another context. Additionally, it is not prevented that a component identified by a number also functions as a component identified by another number.

In some cases, the position, size, shape, range, etc. of each component depicted in a drawing or the like may not represent its actual position, size, shape, range, etc. with the intention to facilitate understanding of the invention. Hence, the present invention is not necessarily to be limited to a certain position, size, shape, range, etc. disclosed in a drawing or the like.

One example of a system which will be described in an embodiment set forth hereinafter includes knowledge DB functionality including hierarchized synonym dictionaries. A set of the synonym dictionaries hierarchized in arbitrary multiple hierarchies is composed of a general-purpose dictionary not dependent of, e.g., business fields, a dictionary by field which is applied to a certain field such as finance, traffic, or public, and a case dictionary which is applied to individual tasks within a certain field, among others. In addition, one of other functions of the system which will be described in the embodiment is a function of generalizing or expanding a dictionary. Another one is a function of applying a word or a set of words contained in a dictionary to a concrete sentence, e.g., a question and answer pair (referred to as a "Q & A"), taking account of context distribution and the contents of a sentence, when applying the contents of a dictionary. A system including one or more functions mentioned above will be referred to as a knowledge bank in the present embodiment.

In the present embodiment, "generalizing" or "generalization" means generating a higher level dictionary from a lower level dictionary in a hierarchy. "Knowledge" refers to a "synonym dictionary (whose contents)" "Application" means "applying" a synonym extracted in the knowledge bank to a certain context. For example, it means "applying" a synonym registered in a dictionary to a practical Q & A. "Expanding knowledge" or "enhancing knowledge" means "increasing synonym pairs." Processing for increasing synonym pairs is referred to as "inferencing".

<1. Overall Configuration of Knowledge Bank>

FIG. 1 is a hardware configuration block diagram of a knowledge bank 1 in an embodiment. The knowledge bank 1 in the embodiment is configured with an information processing device like, e.g., a database server. As with a general information processing device, it is equipped with a Central Processing Unit (CPU) 11, a data communication unit 12, an input/output device 13, a control unit 14, a storage device 15, an input processing unit 16, and an output processing unit 17 among others.

In the present embodiment, functions of calculation, control, etc. are implemented in such a way that programs (not depicted) stored in the storage device 15 are executed by the CPU 11 and defined processing operations are performed in cooperation with other hardware. Programs that the CPU 11 executes, their functions, or sections for implementing the functions may be called "functions", "sections", "parts", "units", "modules", etc. In the present embodiment, they are depicted as incorporated in the control unit 14 in a functional block. It should be noted that functions equivalent to software configured functions can also be implemented by hardware such as an FPGA (Field Programmable Gate Array) and an ASIC (Application Specific Integrated Circuit).

The data communication unit 12 is capable of communication with external terminals and DBs via a network 20. The input/output device 13 is assumed to have an image display device and a key board with which an information processing device like a server is equipped and, in addition, an input/output interface enabling data transmission and receiving to/from an entity external to the knowledge bank 1. Processing of information that is input and output is performed by the input processing unit 16 and the output processing unit 17. The control unit 14 is provided with a generalizing unit 141, a generating unit 142, and an inferencing unit 143 as functions. The generalizing unit 141 has a function of carrying out generalization. The generating unit 142 has a function regarding application of synonyms. The inferencing unit 143 has a function of carrying out dictionary expansion. In addition, the storage device 15 is configured from any combination of a nonvolatile memory like a magnetic disk device and a volatile memory like a semiconductor memory. As DBs that the storage device 15 stores, there are a general-purpose dictionary 151, a domain dictionary 152, a case dictionary 153, and log data 154. Detailed description hereof will be described later.

Although the knowledge bank 1 is described as a database server including DBs in the configuration in FIG. 1, it may be configured as a terminal which calls and processes only data via the network 20 with a DBs part separated off outside. Also, conversely, it may be configured as an information processing device with only arbitrary functions of the control unit 14 being made independent. All of the respective elements depicted in FIG. 1 are not needed to be assembled in an integral device, if it is possible to transmit and receive data via a wired or wireless network.

<2. Overall Configuration of DBs>

FIG. 2 is a conceptual diagram depicting a hierarchical structure of knowledge which is stored in the knowledge bank 1. Concretely, the knowledge includes synonym dictionaries which are stored in the storage device 15. Although there are three hierarchies in this example, there may be more or fewer hierarchies. In the present embodiment, a general-purpose dictionary 151 is assumed as a dictionary not dependent of business fields, a domain dictionary 152 as a dictionary by field which is applied to a same field such as finance or public, and a case dictionary 153 as a dictionary which is applied to individual tasks, e.g., per business entity, within the same field. A general-purpose dictionary 151 is suitable for application to a new case in a new field, because it is independent of fields. Also, a domain dictionary 152 is suitable for application to a new case in the same field.

In a case dictionary 153, sentence examples which are used in the case, e.g., Q & A text data, are assumed to be stored in addition to a synonym dictionary. It is assumed that text data in a lower level dictionary (e.g., a case dictionary 153) can be used also in a higher level dictionary (e.g., a domain dictionary 152). A way of storing text data is, for example, as exemplified in FIG. 4 which will be described later. In a typical example, data for a synonym dictionary and text in a case dictionary 153 which is a lower level dictionary is generated and input by a user. A general-purpose dictionary 151 and a domain dictionary 152 which are higher level dictionaries can be generated by a generalizing method, as will be described in a later embodiment.

Log data 154 which the knowledge bank 1 in the present embodiment stores is data stored, inter alia, when the knowledge bank offers a synonym to be applied to a certain sentence, as a result of user determination made as to whether the synonym is appropriate. The log data 154 will be described in detail later.

<3. Example of Use of the Knowledge Bank>

FIG. 3 is a conceptual diagram depicting one example of use of the knowledge bank 1. It is assumed that, now, there is the knowledge bank comprised of case dictionaries 153 of Agency A, Bank B, and Bank C, public and finance domain dictionaries 152, and a general-purpose dictionary 151. An example of extracting a synonym of a word within dialogue data 301 of Bank D using this knowledge bank is to be considered.

The dialogue data 301 of Bank D is, for example, Q & A text prepared by a user and is input as text data through the input/output device 13. As an arbitrary word within the dialogue data, a synonym candidate is generated by searching the knowledge bank by the generating unit 142 (S302).

FIG. 4 is an example of the dialogue data 301. For each dialogue ID of Bank D, a question and answer text pair is prepared. In the dialogue data 301, a word to draw for synonym development is parenthesized by angled brackets < >. A user may choose which word is subjected to the development or a noun or a verb as such may be extracted automatically by syntax analysis which is publicly known.

FIG. 5 is an example of a domain dictionary 152 which stores a list of synonyms in a finance domain. Here is an example of searching the finance domain dictionary 152 to search for a synonym of a word in the dialogue data of Bank D which is a new case; nevertheless, from among other case dictionaries 153 and a general-purpose dictionary 151, any multiple ones may be selected and searched. The generating unit 142 sets, e.g., an "elevator" in the dialogue data 301 as a subject of which synonyms should be found, extracts, inter alia, an "elevating machine" and a "lift" from a case dictionary 153, and displays them as synonym candidates on the input/output device 13.

Here, a "headword" refers to an ID denoting a set of synonyms. For example, the ID of a set of synonyms {an elevator, an elevating machine, and a lift} is represented by an elevator intelligibly for convenience. A set of synonyms is associated with one headword.

FIG. 6 is an example of a case dictionary 153 and represents the contents of a case dictionary 153 of Agency A which is a lower level dictionary in a public domain. In the present embodiment, case dictionaries 153 are pieces of knowledge of the lowest hierarchy in the knowledge bank and synonymous relationships or the like in the case dictionaries 153 are basically created and registered or input through the input/output device 13 by a user.

A general-purpose dictionary 151 and dictionaries of other hierarchies are also basically the same as the structures of a domain dictionary 152 and a case dictionary. However, synonym sets in which words are put together as synonyms may differ from one another.

A user will verify the synonym candidates extracted as a result of searching the synonym dictionaries, evaluate whether each of them is appropriate, and sort them as, e.g., a positive example (True) or a negative example (False), and input it (S303). Now, as described previously, a display device and an input device with which a user performs an evaluation may be those located at a remote place, separate from, but connected to the knowledge bank via the network 20. In this case, the knowledge bank 1 transmits information to display through the input/output interface of the input/output device 13 and receives user input transmitted back.

Figure 7:
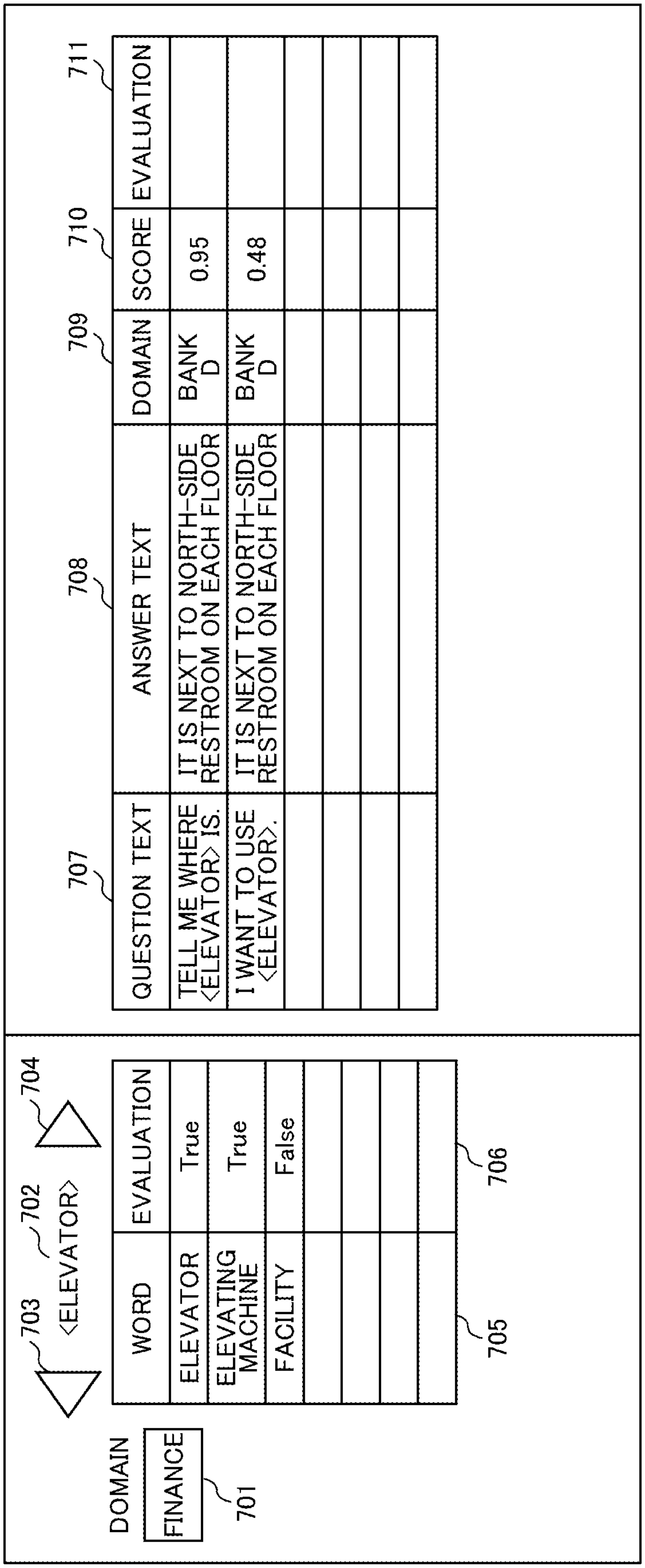
FIG. 7 is a diagram of an input screen which is displayed for evaluation on a display device of an input/output device.

FIG. 7 is an example of an input screen which is displayed for evaluation on a display device of the input/output device 13. An evaluation is made as to whether it is appropriate to include a synonym included in a set of synonyms registered in a dictionary in a set of synonyms in view of sentences (the dialogue data 301 of Bank D in this example) to which the synonym is attempted to be applied. As will be described later, in the present embodiment, a user evaluates whether a synonym can be applied appropriately in each synonym dictionary and a result of the evaluation is counted and recorded as log data 154.

In FIG. 7, in a left part of the screen, a set of synonyms {elevator, elevating machine, facility} regarding a headword "elevator" in a finance domain dictionary is displayed. What dictionary to which the display pertains is displayed in a dictionary type display box 701. When multiple synonym dictionaries have been searched, switching between or among the dictionaries is made by, e.g., a pull-down menu. What is displayed as a headword 702 can be changed by switches 703, 704. A synonym corresponding to the headword 702 is displayed in a synonym list 705. User's evaluation "True/False" is entered in an evaluation 706 column in the left window.

In FIG. 7, in a right part of the screen, text including the headword from the dialogue data 301 of Bank D is displayed. Here, pairs of question text 707 including "elevator" and answer text 708 are displayed. What is displayed in a "domain" 709 column indicates that these pairs of text are the dialogue data of Bank D. The fields of score 710 and evaluation 711 contain scores SS calculated by a method which will be described later; however, these fields may be omitted. An "evaluation" 711 column is not used in this example. Although two pairs of Q & A are presented in FIG. 7, the table may contain one pair or three pairs or more.

Here, a user determines whether it is appropriate to include each element of the set of synonyms {elevator, elevating machine, facility} in a set of synonyms, while referring to the dialogue data of Bank D. In the example of FIG. 7, the user determines that "elevator" and "elevating machine" are appropriate, but including "facility" in a set of synonyms will result in inappropriate transformation.

A result of the evaluation is stored as log data 154 in the knowledge bank, together with the ID of the dictionary from which the synonym candidates are extracted and text of applied sentences. Such an evaluation by user can be performed when the knowledge bank has offered a new set of synonyms. Also, the evaluation can be performed in the same way when the knowledge bank has offered a synonym candidate for registration into a dictionary.

Now, in the "evaluation" 706 column, a default value may be displayed based on a count in log data. For instance, in a finance domain, for a word for which the "False" evaluation count is more than a predetermined count, "False" is displayed in its evaluation 706 filed. A user can change the default value. When a user has changed the default value in the evaluation 706 field or when the user has not changed it, in each case, the value in this field can be included in the count in log data. When the user has not changed it, the defaulted evaluation can be incremented by one, as it is judged that the user confirmed the defaulted evaluation. When the user has changed it, an evaluation contradicting the default can be incremented by one, as it is judged that the user made an evaluation contradictory to the defaulted evaluation. Alternatively, a change to the default value may not be included in the count.

In the manner described above, with regard to the dialogue data 301 of Bank D, synonym development can be performed using synonyms evaluated as "True" by the user. Additionally, using the result, a new case dictionary 153 for Bank D may be generated and registered into the knowledge bank 1.

FIG. 8A is a table diagram representing one example of a data form which is recorded in the log data 154. For example, the following are registered: information 801 identifying a dictionary in which a set of evaluated synonyms is stored, a timestamp 802, user ID 803 who performed evaluation, a headword 804, a synonym 805, question text 806, answer text 807, and evaluation 808 which is either a positive example (True) or a negative example (False). Also, what is contained in a "classified as" 809 column indicates what phase in which the evaluation is made. As phases of evaluation, there are the following classifications: generalizing, expansion, and application. The timestamp 802, user ID 803, and classified as 809, inter alia, may be optional. In addition, the question text 806 and answer text 807 may be optional items in an application phase. Also, conversely, another item, e.g., a domain name relevant to the question text 806 and answer text 807 may be added.

First to sixth rows of a table of FIG. 8A contain an example of log data to which an input example in FIG. 7 is converted. This table is applied to the dialogue data 301 of Bank D. Evaluations on synonyms "elevator", "elevating machines", and "facility" of the headword "elevator" are input. A user, for example, refers to question text and answer text being displayed and determines whether it is appropriate to include a synonym in a set of synonyms of the headword "elevator" in such example sentences. Thus, as a structure of log data, an evaluation 808 of "True" or "False" is given to a combination of the headword 804 and a synonym 805.

In the present embodiment, evaluation of a synonym made by a user, as described, represents whether or not it is appropriate that the synonym is included in a set of synonyms in a certain situation. Also, True/False is recorded for a pair of a headword and a synonym is recorded in the log data.

Additionally, in the example of FIG. 8A, synonyms "elevator" and "elevating machines" are evaluated as "True" for in the context of two Q & A pairs in the right part of FIG. 7 and a synonym "facility" is evaluated "False" in the context of two Q & A pairs in the right part of FIG. 7. As for a way of making an entry, there is no need to limit it to the way as in FIG. 7, provided that evaluation can be made for a combination of a synonym and text to which it is applied.

<4. Generalizing Knowledge in the Knowledge Bank>

As described previously, by searching multiple dictionaries, particularly, dictionaries of higher hierarchy in the hierarchized knowledge bank, searching is enabled without restriction to a particular case dictionary and it is possible to search for a set of synonyms that are appropriate for text. Then, a description is provided for how to generalize knowledge in the knowledge bank, that is, how to register a synonym into a higher level dictionary.

FIG. 9 is a conceptual diagram of a generalizing process by extracting an intersection. Now, registering a synonym into a higher level dictionary X (e.g., a finance domain dictionary 152-1) is to be considered. Y is to stand for a set of lower level dictionaries y (e.g., a Bank B case dictionary 153-1 and a Bank C case dictionary 153-2) under the higher level dictionary X. The set Y includes lower level dictionaries y1, y2, etc. The generalizing unit 141 registers a word registered in all the lower level dictionaries y1, y2, etc. with the higher level dictionary X as a synonym.

For example, "house" "apartment", and "my home" are registered as synonyms in both the Bank B case dictionary 153-1 and the Bank C case dictionary 153-2. Therefore, the generalizing unit registers these words as synonyms also with the higher-level finance domain dictionary 152-1. Also, "house" and "apartment" are registered as synonyms in both the finance domain dictionary 152-1 and a public case dictionary 152-2. Therefore, the generalizing unit registers these words as synonyms also with a higher-level general-purpose dictionary 151.

Because a method described above registers an intersection common to lower level dictionaries into a higher level dictionary, synonymous relationships are easy to establish if it is applied within a same case and a same field. However, because narrowing down is only performed in the method that extracts an intersection, words that would be synonyms in essence will be removed. Therefore, in the present embodiment, a contrivance is proposed that makes a boarder set of synonyms permitting somewhat exceptional ones and prompts a user to evaluate whether to apply a synonym. In this regard, however, a too broad set of synonyms, if made, increases noise and makes user operation for evaluation more complex. Therefore, metrics of a coverage ratio and an error ratio are introduced in an embodiment described below.

Figure 10:
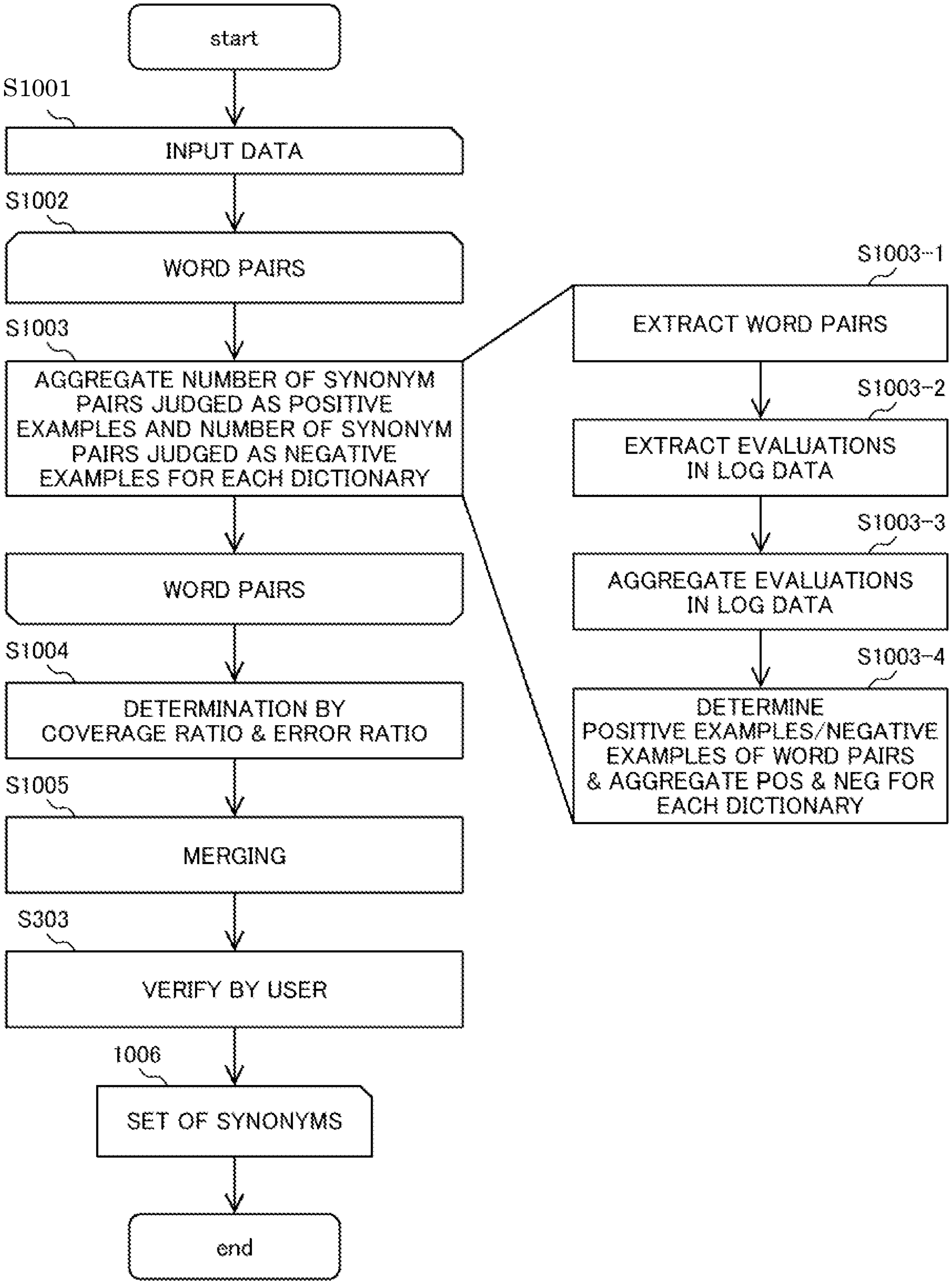
FIG. 10 is a flowchart illustrating a sequence of extracting a synonym candidate.

FIG. 10 is a flowchart illustrating a sequence of extracting a synonym candidate, taking account of a coverage ratio and an error ratio, which is performed by the generalizing unit 141. Now, registering a synonym into a higher level dictionary X (e.g., a domain dictionary 152) is to be considered. To do so, find a set of synonyms to register with the higher level dictionary X from results of synonym evaluations by user in a set Y of lower level dictionaries (e.g., case dictionaries 153). This processing may be performed as needed at any time or periodically.

FIG. 10 starts with a step S1001 of receiving input data. As input data, the following are used:

1) synonym data in the lower level dictionaries y under the higher level dictionary X;

2) data of evaluation by user for synonym candidates in all the lower level dictionaries y under the higher level dictionary X;

3) the number of the lower level dictionaries y under the higher level dictionary X;

4) a lower limit value BC of coverage ratio, which is set optionally; and 5) an upper limit value BE of error ratio, which is set optionally.

1) Synonym data in the lower level dictionaries y can be retrieved from the respective dictionaries (e.g., case dictionaries 153 presented in FIG. 6). 2) Data of evaluation by user can be retrieved from the log data 154. As described with FIG. 7 and FIG. 8, synonym candidates offered based on synonyms registered in the dictionaries are sorted and evaluated by user as a positive example (True) and a negative example (False) in each phase of generalizing, expansion, and application. Evaluations for use in 2) above are results of determinations made as to whether or not each synonym in a same set of synonyms should be included in a set of synonyms. That is, True or False evaluation is performed for a combination of a headword and a synonym. As described with FIG. 8, this evaluation result is recorded in the log data 154.

Next, a step S1002 is performed to determine word pairs. A step S1003 of processing is aggregating the number of synonym pairs judged as positive examples and the number of synonym pairs judged as negative examples for each dictionary. Detail of the step S1003 is described with steps S1003 to S1003-4 in a right part of FIG. 10.

The generalizing unit 141 extracts word pairs (w1, w2) from synonym data in the lower level dictionaries y (S1003-1). Then, it extracts evaluation data (S1003-2), referring to the log data 154 about results of evaluating a pair of x and w1 and a pair of x and w2, when x is to stand for a headword that is common for the respective word pairs (w1, w2) and aggregates the number pos of such pairs judged as positive examples and the number neg of such pairs judged as negative examples for each dictionary (S1003-3).

To illustrate with a concrete example, when attempting to extract a synonym candidate to register with the general-purpose dictionary 151 in FIG. 9, the generalizing unit 141 extracts a word pair "elevator" and "facility" from a set of synonyms with a headword <elevator> in the finance domain dictionary 152-1 (S1003-1). Then, it refers to the log data 154 about results of evaluating a pair of the headword <elevator> and "elevator" and a pair of the headword <elevator> and "facility" (S1003-2). In the example of FIG. 8A, a result of evaluating <elevator> and "elevator" is a True count of 2, i.e., the pos number is +2 and a result of evaluating <elevator> and "facility" is a False count of 2, i.e., the neg number is +2. The generalizing unit executes such aggregation for each dictionary (S1003-3).

When judgment is made as to whether a pair of synonyms is right or wrong in the generalizing process, a pair of synonyms is judged right (positive example) in a case where the pair of synonyms has the same headword and both are True. Because, actually, evaluations made by multiple evaluators at multiple times are included in the log data, it is supposed that different evaluations are given to the same pair of a headword and a synonym. Therefore, as will be described below, evaluation results per dictionary are determined by majority decision from aggregation results (S1003-4).

FIG. 11 is a table diagram to explain the concept of the aggregation. For pairs, each including a headword 1101 and a synonym 1102, evaluation results in dictionaries which are specified by domain 1107 and case 1106 are aggregated. In this example, a Bank B dictionary and a Bank C dictionary in a finance domain are subject to processing. Aggregation can be performed based on log data as exemplified in FIG. 8. Additionally, when log data is classified by phase as application, generalizing, or expansion, as in FIG. 8, data in, e.g., an application phase may solely be used. Alternatively, all data may be used with different weights given to each of the phases.

At the step S1003-1, the system automatically generates word pairs (synonym pairs) associated with a headword. A set of synonyms (house, factory, home) associated with a headword <house> are extracted and, from these synonyms, the system generates synonym pairs. Referring to the log data in the dictionary, as presented in FIG. 11, at the step S1003-2, the number of positive examples (True) 1104 and the number of negative examples (False) 1105 for each synonym are aggregated at the step S1003-3. According to which is more between the positive examples (True) and the negative examples (False), it is determined as a general evaluation result 1103 whether the synonym (candidate) tends to be evaluated appropriate as a synonym or tends to be evaluated inappropriate in each dictionary. The general evaluation result may be simply evaluated by amount or optional weights may be given to the positive examples (True) and the negative examples (False). Also, another manner may be adopted.

Statistically, it may be said that a synonym having a larger count of positive examples is the synonym for which paraphrasing is appropriate in more instances (i.e., it is more versatile) and a synonym having a larger count of negative examples is the synonym for which paraphrasing is inappropriate in more instances (i.e., it is less versatile). Hence, based on the count of negative examples and the count of positive examples, it can be determined whether to set a synonym registered in a lower level dictionary to be a candidate that should be registered with a higher level dictionary.

As described previously, a pair of synonyms is judged right (positive example) only in a case where the pair of synonyms has the same headword and both are True. Therefore, in the example of FIG. 11, a pair of synonyms "house" and "home" is a positive example and a pair of "house" and "factory" and a pair of "home" and "factory" are negative examples. In the Bank C dictionary, all pairs of synonyms "house" and "home", "house" and "factory", and "home" and "factory" are judged as positive examples.

In the manner described above, after determining positive examples and negative examples for pairs of synonyms in each dictionary, the generalizing unit 141 acquires information given below from the log data 154. y1 and y2 denote lower level dictionaries, (p1, p2) denote word pairs recorded as positive examples, and (n1, n2) denote word pairs recorded as negative examples.

Positive examples: {y1:{p1, p2, . . . }, y2:{ . . . }, . . . } p1, p2 are words

Negative examples: {y1:{n1, n2, . . . }, y2:{ . . . }, . . . } n1, n2 are words

With respect to each word pair (x1, x2), the number of dictionaries in which (x1, x2) more often appear as positive examples is counted and aggregated as POS. Likewise, the number of dictionaries in which (x1, x2) more often appear as negative examples is counted and aggregated as NEG (S1003-4). In the example of FIG. 11, when two dictionaries, a Bank B dictionary and a Bank C dictionary are subject to processing, results are POS=2, NEG=0 for a pair of synonyms "house" and "home", POS=1, NEG=1 for a pair of synonyms "house" and "factory", and POS=1, NEG=1 for a pair of synonyms "home" and "factory".

Then, word pairs (x1, x2) are set to be synonym candidates in a higher level dictionary X, if conditions given below are fulfilled (S1004).

$$POS/N \geq \text{lower limit value of coverage ratio}$$

$$NEG/N \leq \text{upper limit value of error ratio}$$

(N is the number of lower level dictionaries y belonging to a set Y)

The lower limit value of coverage ratio and the upper limit value of error ratio should be set by user in advance. If POS/N and NEG/N assumes a value from 0 to 1, both the coverage ratio and the error ratio also assume a value from 0 to 1. A coverage ratio of 1 means that more examples in which the synonym is evaluated appropriate are found in all dictionaries. An error ratio of 1 means that more examples in which the synonym is evaluated inappropriate are found in all dictionaries.

As word pairs (x1, x2) set to be synonym candidates, if there are, for example, a pair of synonyms "number" and "telephone number" and a pair of synonyms "number" and "phone number", the generalizing unit performs merging to merge "number", "telephone number", and "phone number" into a set of synonyms (S1005).

After acquiring the set of synonyms, evaluation by human is made as to whether or not the set of synonyms is appropriate (S303). A result of the evaluation is registered as the log data 154.

FIG. 12 is an example of an input screen which is displayed on the display device of the input/output device 13 for evaluation by user as to whether or not the set of synonyms is appropriate. An evaluation is made as to whether a synonym registered in the set Y of lower level dictionaries is appropriate to be registered in a set of synonyms in a higher level dictionary X. A basic structure is the same as FIG. 7. For the set of synonyms extracted at step S1005 as synonym candidates that should be registered with a higher level dictionary, evaluation is made as to whether each candidate is right as a synonym and input to an "evaluation" 706 field.

In the example of FIG. 12, a set of synonyms "application", "notification", and "submission" which belong to a headword "application" is displayed in a left part of the screen and text extracted from the related domain is displayed in a right part of the screen. In this example, because the generalizing unit attempts to generate a set of synonyms in a finance domain dictionary, Q & A text retrieved from case knowledge of banks may be displayed for reference.

In response to these Q & A texts, a user will make evaluation as to whether a synonym candidate is appropriate and input the evaluation in the "evaluation" 706 field.

First to third rows in FIG. 8B are an example in which an input example in FIG. 12 is recorded as log data. Evaluations about synonym candidates "application", "notification", and "submission" for a headword "application" which is applied to dialogue data 301 of Bank A and Bank B belonging to a finance domain are input. Here, in this example, synonyms "application" and "notification" are evaluated "True" and a synonym "submission" is evaluated "False". As for a way of making an entry, there is no need to limit it to the way as in FIG. 12, provided that evaluation can be made of synonyms. As a result of evaluation by user, a set of synonyms 1006 including "application" and "notification" is obtained and this is registered with the higher level dictionary X.

<5. Expanding Knowledge in the Knowledge Bank>

Processing of expanding knowledge in the knowledge bank, i.e., increasing synonym pairs is described. To infer a synonymous relationship, deductive inference can be used. For example, when "number" and "telephone number" are synonyms and "number" and "phone number" are synonyms, a deductive inference that "telephone number" and "phone number" are synonyms is true. Nevertheless, whether they are true as synonyms is also related to context in which they are used. For example, just because "number" and "personal number" are synonyms and "number" and "telephone number" are synonyms, it is hard to say that "telephone number" and "personal number" are true as synonyms in all contexts (In the foregoing generalizing process, merging of words that are very likely to be synonyms is performed).

Because whether synonyms can be interpreted as those having the same meaning depends on context, when increasing synonyms that are words in particular contexts, it must be considered whether a synonym of interest is apt for context. Therefore, expanding a dictionary taking account of a similarity degree between contexts is described in an embodiment described below.

In this embodiment, three elements are taken into consideration: (1) context of a sentence in which synonyms are true; (2) context of a sentence to which a synonym is attempted to be applied; and (3) a set of sentences to which a synonym is attempted to be applied. As an example of (3), e.g., if a synonym which is attempted to be applied is used in a Q & A with a different answer in a Q & A list to which a synonym is attempted to be applied, it is inferred that the synonym is used in a different sense and the synonym is not applied.

In the following embodiment, with regard to (1), a "similarity degree" between contexts is used to evaluate whether a synonym is applied. When Q & A texts are used as contexts, a similarity degree is evaluated, taking account of combinations of similarity degrees between Q & A texts. For example, if a and b are defined as synonyms in a Q & A pair including question text Q1 and answer text A1 and b and c are defined as synonyms in a Q & A pair including question text Q2 and answer text A2, it is determined whether b and c can be defined as synonyms, based on similarity degrees evaluated with Q1, Q2, A1, A2. How to make combinations of similarity degrees and similarity degree evaluations are, for example, as given below:

When the similarity degree between Q1 and Q2 is high and the similarity degree between A1 and A2 is high: a similarity degree is high;

When the similarity degree between Q1 and Q2 is low and the similarity degree between A1 and A2 is high: a similarity degree is medium (high);

When the similarity degree between Q1 and Q2 is high and the similarity degree between A1 and A2 is low: a similarity degree is medium (low);

When the similarity degree between Q1 and Q2 is low and the similarity degree between A1 and A2 is low: a similarity degree is low;

In the present embodiment, an information processing method for outputting new knowledge based on previously registered knowledge, namely, a new knowledge inferencing unit 143 is used. In the inferencing unit, different contribution ratios are used for different kinds of text like a question and an answer in a dialogue. According to this example, by using different contribution ratios for different kinds of data, it is possible to expand knowledge with high accuracy.

Figures 13, 14:
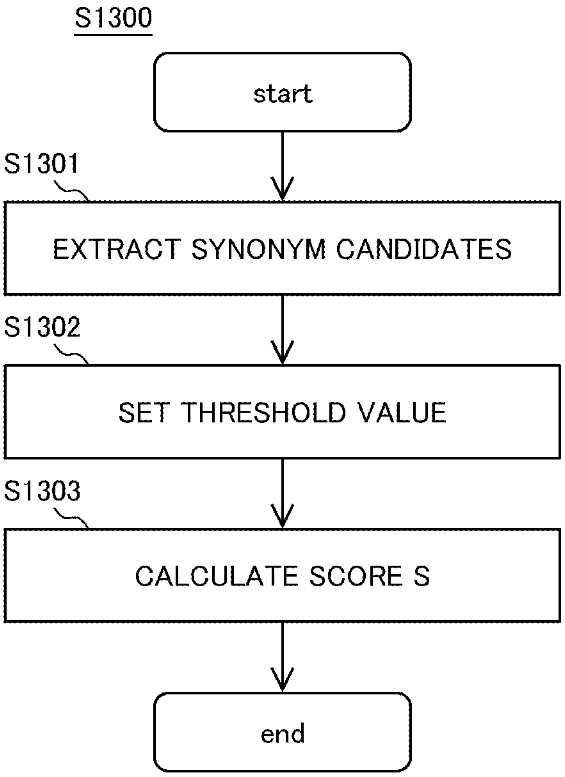
FIG. 13 is an overall flowchart of a knowledge expansion process.
FIG. 14 is a table diagram representing one example of a domain dictionary of public knowledge.

FIG. 13 is an overall flowchart of a knowledge expansion process S1300 which is performed by the inferencing unit 143 in the knowledge bank 1. This process can be performed at any time or may be performed periodically.

First, the inferencing unit extracts synonym candidates (S1301). For extracting synonym candidates, the inferencing unit 143 reads at least subsets of a general-purpose dictionary 151, domain dictionaries 152, and case dictionaries 153 from the storage device 15. A range in which data is used, such as, e.g., a same business domain, may optically be determined. In optional knowledge, if it is defined that a and b are synonyms and a and c are synonyms, b and c are set to be a word pair of synonym candidates.

FIG. 14 is one example of a domain dictionary 152 of public knowledge. In the public domain, if synonyms are defined as in FIG. 14 and if "home" and "house" are defined as synonyms in a first row and "home" and "home" and "residence" are defined as synonyms in a third row, "house" and "residence" are set to be a word pair of synonym candidates.

FIG. 15 is another example of a domain dictionary 152 of public knowledge. As in FIG. 15, in a first row, if there are multiple synonyms of "home", such as "house" and "dwelling", two pairs of "house" and "residence" and "dwelling" and "residence" become word pairs of synonym candidates.

In the foregoing examples, synonym candidates are extracted from within a same dictionary. However, synonym candidates may be extracted from across multiple dictionaries. For example, if "account" and "bank account" are synonyms in a Bank B case dictionary 153-1 and "account" and "deposit account" are synonyms in a Bank C case dictionary 153-2, "bank account" and "deposit account" may be set to be synonym candidates. Condition setting for dictionaries subject to this processing may optionally be performed by user.

Then, a user sets a numerical value serving as a threshold or other parameters to determine whether to register a synonym candidate as a synonym (S1302). Function of the threshold value will be described later. Then, the inferencing unit 143 calculates scores of word pairs of synonym candidates (S1303).

Here, the scores are used to evaluate whether a synonym candidate is appropriate as a synonym, taking account of context of a sentence to which it is supposed to be applied. A fundamental idea is such that, if a sentence in which a synonymous relationship between a and b is true and a sentence in which a synonymous relationship between a and c is true are similar, a synonymous relationship between b and c is true. To measure a similarity degree between sentences, diverse methods for vectorizing and comparing sentences are known. As for sentence vectorization, detailed description is omitted because it is publicly known.

In an evaluation method using a similarity degree between sentences, if synonym candidates b and c are applied to a Q & A text, a score S of the synonym candidates is expressed below:

$$S=\tfrac{1}{2}*\mathrm{sim}(q1,q2)+\tfrac{1}{2}*\mathrm{sim}(a1,a2)$$

where q1 and a1 are question text and answer text in which a synonymous relationship of b to a headword a is true, q2 and a2 are question text and answer text in which a synonymous relationship of c to the headword a is true, and sim is a function indicating a similarity degree.

In calculation of score S above, question text and answer text are handled to have the same weight. Nevertheless, according to examination by the inventors, it is more desirable to take account of two elements below for score calculation.

(1) Especially in dialogue data, a similarity degree between answer texts is more correlated to a determination of whether or not words are synonyms than a similarity degree between question texts. Therefore, in evaluating a similarity degree, it is desirable to give more weight to a similarity degree between answer texts than to a similarity degree between question texts and make evaluation.

(2) In dialogue data, if, as a question text paired with another different answer text within the same dialogue data, there is an expression that is similar to a text in which a synonym candidate replacement is made, the expression is considered as a penalty term. That is, an answer text that differs should be paired with a question text that has a different meaning. Nevertheless, the fact that the question text is similar to the text instance where a synonym candidate replacement is made indicates that the replacement is inappropriate.

Now, it is assumed that there is a pair of question text and answer text including question text q1i and answer text a1i in dialogue data 1, the text q1i includes a headword <e1>, and syn11 and syn12 are defined as synonyms of <e1>. Also, Q1 is to stand for a set of question texts (q11, . . . , q1i, . . . , q1n) included in the dialogue data 1. On the other hand, it is assumed that a pair of question text and answer text including question text q2j and answer text a2j in dialogue data 2, the text q2j includes a headword <e2>, and syn11 and syn22 are defined as synonyms of <e2>. Also, Q2 is to stand for a set of question texts (q21, . . . , q2j, . . . , q2m) included in the dialogue data 2. Here, i, j, n, and m are positive integers with relationships of $1 \le i \le n$ and $1 \le j \le m$.

FIG. 16 is a table diagram representing examples of dialogue data 1, dialogue data 2, synonym data relevant to dialogue data 1, and synonym data relevant to dialogue data 2. These pieces of data are retrieved from dictionaries from which synonym candidates are extracted, e.g., case dictionaries 153, but it is necessary that dialogue data is included in the dictionaries. For example, the dialogue data 1 and the synonym data relevant to the dialogue data 1 are retrieved from the Bank B case dictionary 153-1. The dialogue data 2 and the synonym relevant to the dialogue data 2 are retrieved from the Bank C case dictionary 153-2.

In the examples of FIG. 16, because sny11 and syn12 are synonyms in the dialog data 1 and syn11 and syn22 are synonyms in the dialog data 2, an example in which syn12 and syn22 are extracted as synonym candidates in the step S1301 is presented. Here, to calculate a score S for determining whether or not the synonym candidates syn12 and syn22 can be defined as synonyms, an equation below is used.

$$S=(1-K)*\mathrm{sim}(q1i,q2j)+K*\mathrm{sim}(a1i,a2j)$$

$$L*\max\{\mathrm{sim}(q1i,f1(g,syn11,syn22));g\in Q1-\{f2(q1i)\}\}$$

$$L*\max\{\mathrm{sim}(q2j,f1(q,syn11,syn12));g\in Q2-\{f2(q2j)\}\}$$

In the first and second terms in the right member, q1 and a1 are question text and answer text in the dialog data 1 and a synonymous relationship between a and b is true. q2 and a2 are question text and answer text in the dialog data 2 and a synonymous relationship between a and c is true. sim is a function indicating a similarity degree. If synonyms appear in multiple Q & A texts, the first term in the right member is averaged. For example, it is to be considered that q1i and q1k are included in the data 1 subject to processing and the headword <e1> is included in both. k is a positive integer with a relationship of 1≤k<i or i<k≤n. At this time, the first term in the right member is transformed as below. This is also true for the second term.

$$(1-K)*\mathrm{avg}(\mathrm{sim}(q1i,q2j)+\mathrm{sim}(q1k,q2j))$$

The third term is transformed as below. This is also true for the fourth term.

$$L*\max\{\mathrm{sim}(p,f1(q,syn11,syn22));g\in Q1-\{f2(q1i),f2(q1k)\}\hat{}p\in\{q1i,q1k\}\}$$

K is a positive number that fulfills 0≤K≤1 and will be set by user in the step S1302. K gives a weight when reflecting a similarity degree between question texts and answer texts in the score S. This makes it possible to give a weight for each part of context. Given the finding (1) noted previously, it is desirable to give a weight as 0.5<K to a similarity degree between answer texts. As is evident from the foregoing description, a larger value as the sum of the first term+the second term in the right member increases means that it is more likely that syn12 and syn22 are defined as synonyms.

Then, the third term and fourth term in the right member are given in consideration of the finding (2) noted previously. L is a positive number that fulfills 0≤L≤1 and will be set by user in the step S1302. f1(q, syn1, syn2) is a function to output a text in which a headword having a synonym, namely, syn1 in a question text q is replaced by syn2. f2(q) is a function to output a set of question texts having an answer text to q to answer them.

According to the foregoing definition, the third term g∈Q1−{f2(q1)} in the right member is question texts included in Q1 other than question texts having an answer text to q1 to answer them (question texts not having an answer text to q1 to answer them). Furthermore, max{sim (q1, f1(q, syn11, syn12)) determines a maximum value of similarity degree between a text in which a question text not having an answer text to q1 to answer it is replaced by a synonym and q1. Because an answer differs, these question texts shall not be similar. Hence, the third term in the right member acts as a penalty term. L is a weight to be given to the penalty term. The third term in the right member is given in consideration of dialogue data 1 and the fourth term in the right member is likewise given in consideration of dialog data 2.

Finally, the inferencing unit compares the score S with the threshold value that is set by user in the step 1302 and determines whether to register the synonym candidates syn12 and syn13 as synonyms. If they have been determined to be synonyms, they are registered and included in a set of synonyms in the dictionaries from which dialogue data 1 and dialogue data 2 are retrieved, e.g., case dictionaries 153.

FIG. 17 is an example indicating that a similarity degree between answer texts is more correlated to a determination of whether or not words are synonyms than a similarity degree between question texts. Here, synonym candidates are extracted from four domain dictionaries 152. Here, synonym candidates including a word "number" are listed below, but word pairs (1) and (6) are only judged as synonyms.

(1) "Car registration number" and "Number plate"
(2) "Car registration number" and "My number"
(3) "Car registration number" and "Personal number"
(4) "Number plate" and "My number"
(5) "Number plate" and "Personal number"
(6) "My number" and "Personal number"

FIG. 18 is a table representing a relationship among a similarity degree between question texts, a similarity degree between answer texts, and synonym determination. A larger weight is given to the similarity degree between answer texts than the similarity degree between question texts. For that reason, (4) a word pair Q2-Q3 and (5) a word pair Q2-Q4 for which the similarity degree between question texts is only high are judged not to be synonyms, whereas (1) a word par Q1-Q2 for which the similarity degree between answer texts is only high is judged to be synonyms.

If the similarity degrees between question texts or answer texts are within a narrow range, presenting a display in which question texts and answer texts are juxtaposed as in FIG. 17 together with a display in FIG. 18 facilities evaluation by user. In addition, in a case where question texts are similar, but there is a large proportion of non-similar answer texts, it is likely that appropriate synonym candidates are not included; therefore, it is desirable to alert a user, for example, by issuing a warning.

Again, synonym candidates are evaluated by user in the same manner as described in the section <4. Generalizing knowledge in the knowledge bank>. Using the calculated scores, the generalizing unit 141 displays synonym candidates having scores above or at a threshold value that is, for example, set in the step S1302, to the user through the input/output device 13. When doing so, the generalizing unit may display and sort the scores.

When the user has evaluated (1) "Car registration number" and "Number plate" and (6) "My number" and "Personal number" as True, the True evaluations are recorded together with the dictionary type in which the words are used, as is in first to eighth rows in FIG. 8C.

Also, at this time, as new synonym pairs, the generalizing unit may register "Car registration number" and "Number plate" associated with a headword <Car registration number> and "My number" and "Personal number" associated with a headword <My number> in the dictionary in which the words are used. In this way, it becomes possible to expand a synonym dictionary.

<6. Applying Knowledge in the Knowledge Bank>

In the description provided hereinbefore, the contrivance of how to generalize and expand knowledge in the knowledge bank and evolve a synonym dictionary has been explained. Then, a process is described that applies the thus generated knowledge in the knowledge bank to actual sentences and performs synonym replacement. Because whether synonyms have the same meaning depends on context, in order to see whether a set of synonyms are appropriate as synonyms in particular contexts, it must be verified whether a synonym of interest is apt for context; this has involved a substantial cost. When applying synonyms in the knowledge bank, particularly, in a higher level general-purpose dictionary, it is difficult to enable making an appropriate replacement at all times, dispensing with checking by human.

Figure 19:
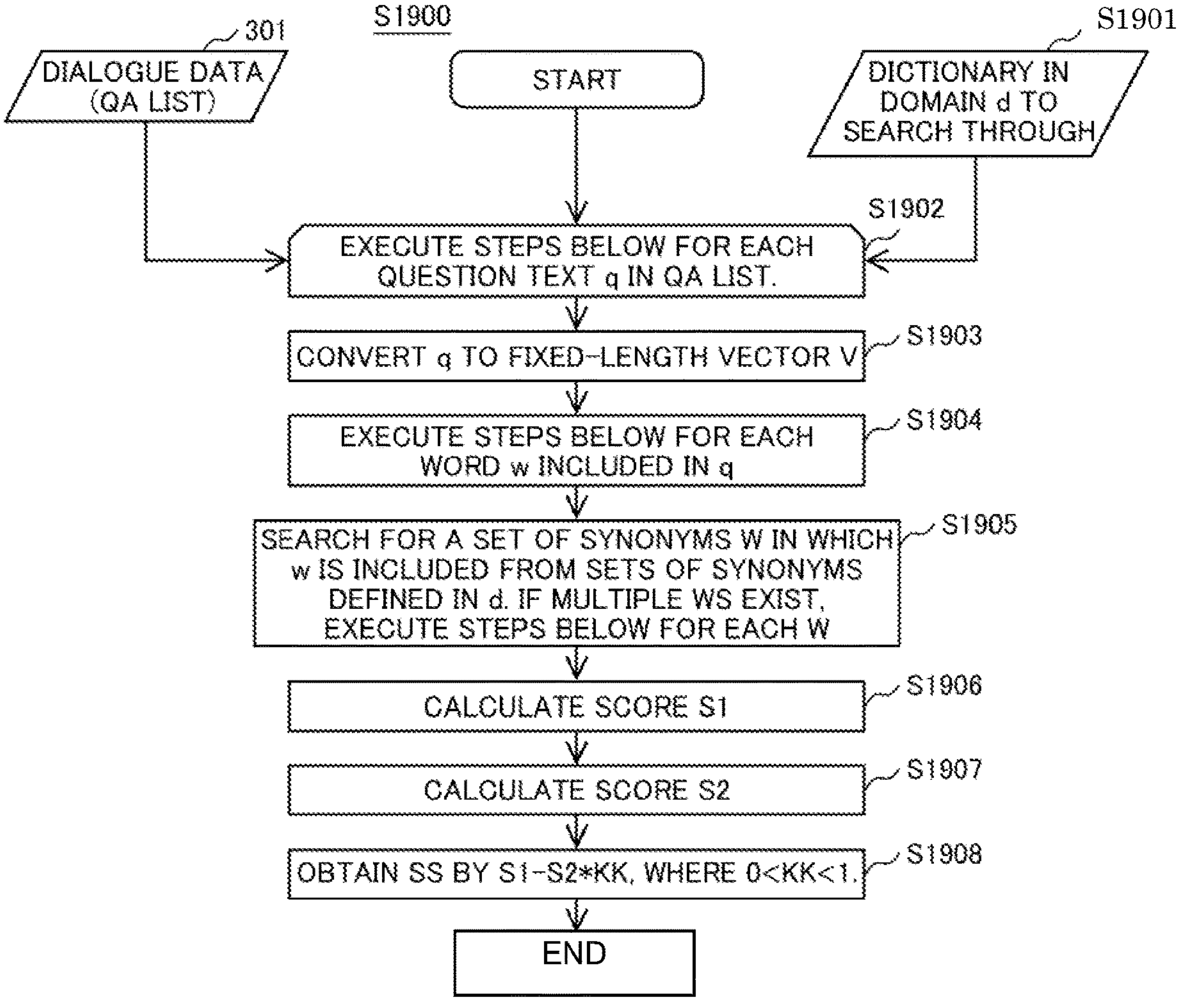
FIG. 19 is a flowchart illustrating a flow of an application process.

FIG. 19 is a flowchart illustrating a flow of an application process in the present embodiment. The application process S1900 can utilize a part or all of a generating process S302 in FIG. 3.

What is input to the generating unit 142 is dialogue data 301 in which synonym replacement is attempted to be made, e.g., a Q & A list (dialogue data 301 of Bank D in FIG. 3). Q is to stand for a set of question texts in a Q & A list and q is to stand for a question text. Also, dictionary data in a domain d to search through (e.g., a finance domain dictionary 152 in FIG. 3), namely, a set of synonyms is input (S1901). Output of the generating unit 142 is a pair of a set of synonyms W and its score SS for each question text q in the Q & A list. The process executes steps S1903 to S1908 for each question text q in the Q & A list (S1902). First, the process converts a question text q to a fixed-length vector (S1903). The process executes steps S1905 to S1908 for each word w included in the question text q (S1904).

The process searches for a set of synonyms W in which w is included (S1905). What to search through shall be sets of synonyms in the dictionary defined by d. If multiple sets of synonyms Ws exist, the process executes steps S1906 to S1908 for each W.

The generating unit 142 calculates a score S1 (S1906), calculates a score S2 (S1907), and obtains SS by S1−KK*S2 (S1908). Detail of each step is described below.

In the step of calculating a score S1 (S1906), the generating unit calculates a generation probability of a question text vector V in a context distribution WC=(AVE, VAR) of sentences in which the elements of the set of synonyms W appear and obtains S1 (0≤S1≤1).

Figure 20:
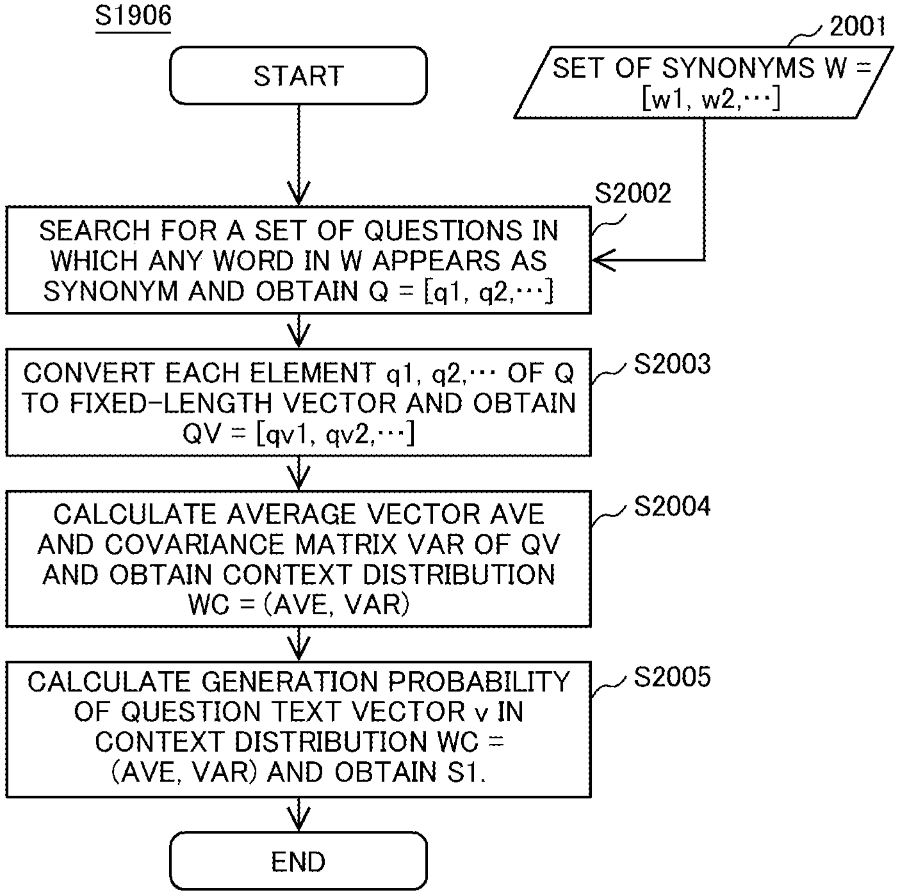
FIG. 20 is a detailed flowchart of calculating a score.

FIG. 20 is a detailed flowchart of calculating a score S1 (S1906). Input is set of synonyms 2001 W={w1, w2, . . . } and output is a generation probability of a question text vector in the context distribution WC of sentences in which the elements w1, w2, . . . of the set of synonyms W appear.

First, the process searches for a set of questions in which any word w1, w2, . . . in W appears from the Q & A list and obtains Q={q1, q2 . . . } (S2002).

Then, the process converts each element of Q to a fixed-length vector and obtains QV={qv1, qv2 . . . } (S2003). A vectorization method is, for example, to convert each of the words of q to a fixed-length vector using a learning method of word embedding expression called word2vec and average the thus obtained vectors. Alternatively, q may directly be converted to a fixed-length vector using a text vectorization method called doc2vec.

Then, the process calculates an average vector AVE and a covariance matrix of QV and obtains a context distribution WC=(AVE, VAR) (S2004). The process calculates a generation probability of the fixed length vector V of a question text q in the context distribution WC and obtains a score S1 (S2005).

The score S1 indicates a relationship between the question text q and texts in which a synonym of a word existing in the question text q is used. It is characteristic to calculate a probability from the distribution (average and dispersion) of context (namely, text) in which a word within the set of synonyms is used. For example, if all the texts in which a word within a set of synonyms is used are nearly similar, the question text q should also be akin to those. In this case, because dispersion is small, the generation probability S1 becomes small, though q of interest somewhat differs from average. Conversely, if the texts in which a word within a set of synonyms is used are not similar to each other, this means that any text has the potential of synonym development in it. In this case, because dispersion becomes large, the generation probability S1 becomes large, though there is some deviation from average.

Hence, it can be said that, if S1 is large, there is a large possibility that applying the set of synonyms W to the question text q is appropriate and, if S1 is small, there is a large possibility that applying the set of synonyms W to the question text q is inappropriate. As for the foregoing calculation of a score S1, processing may be performed only for question text in Q & A.

In the step of calculating a score S2 (S1907), q' is to stand for a text to which a question text q is modified by synonym development (replacement) with each synonym w within the set of synonyms W. Then, the process searches for another question text that is most similar to q' (but having another answer text than an answer text to q), evaluates its similarity degree, and obtains S2 (0≤S2≤1). Here, $$S2=\max\{\mathrm{sim}(q',q'')\}$$

where q' is a text to which q is modified by replacement with w∈W and q" is ∈Q−{a2q(q2a(q))}, where q2a(x): a function to output an answer text paired with a question text x a2q(x): a function to output a question text paired with an answer text x That is, q" is a question text having an answer different from an answer to q. Because, if multiple synonyms m exist in the set of synonyms W, multiple texts q' also exist, S2 assumes a maximum value max of similarity degree.

Intention of using score S2 is that it is desired to reflect in the score a risk that a question text modified after synonym development becomes similar to a question having another answer. Because a question having another answer is naturally the question having another meaning, a set of synonyms with which paraphrasing resulting in such similarity between questions is possible should be removed from candidates. Therefore, the score S2 acts as a penalty term.

Finally, the process obtains SS by S1−KK*S2 (S1908), where KK is 0≤KK≤1. Here, KK is a weight that is given to the penalty term and may optionally set by user. Eventually, the process outputs the question text q, the set of synonyms w, and the score SS.

Now, in the example of FIG. 19, the process executes calculating a score S1 and calculating a score S2 sequentially; however, if the score S1 is not beyond a predetermined threshold value, the process may skip calculating the score S2 and subsequently remove the set of synonyms W from candidates.

FIG. 21 is an example of a screen in which a result of the application process S1900 is displayed for evaluation by user on the input/output device 13. With respect to each question text in a Q & A list, a set of synonyms W and its score SS are displayed.

In a right part of the screen, question text 707 and answer text 708 of Q & A of Bank D are displayed. In a domain column 709, it is displayed that text belongs to the domain of Bank D. A set of synonyms W to be evaluated is displayed in a left part of the screen and score SS is presented in a score 710 column for reference in evaluating whether this synonym set is appropriate for the Q & A in the right part. With reference to the score 710, a user can enter a final evaluation in an evaluation 711 column. A result of the evaluation is recorded as log data as a result of evaluating knowledge of Bank D. If the synonym set is appropriate for the Q & A, synonym development in the text can be performed using the synonym set (dictionary). Alternatively, it is also possible to collect sets of synonyms evaluated appropriate and create a new dictionary.

In this case, the evaluations are as below: the set of synonyms W including "application", "notification", and "submission" can be applied to a Q & A including a question text "What paperwork is necessary for <application>?" in a first row in the right part of FIG. 21 and cannot be applied to a Q & A including a question text "Where can I make <application>?" in a second row. Accordingly, the elements of the set of synonyms W are evaluated True or False with respect to each Q & A.

The set of synonyms presented in the left part of the screen, which are used for a Q & A evaluated True, can also be modified at the same time. In the example of FIG. 21, "notification" and "submission" are evaluated False and would be removed from the synonym set. In addition, a user can add a new synonym then and there. In the example of FIG. 21, "declaration" is newly added.

First to fourth rows in FIG. 8D contain records in which results of evaluation made by user in the application process are recorded as log data. For Q & A pairs to which a headword <application> can be applied, it is determined whether a set of synonyms of the headword can further be applied to them. In addition, "declaration" added is evaluated True. Moreover, evaluation 711 is recorded separately for Q & A and a set of synonyms W.

Furthermore, it is also possible to reflect the coverage ratio and the error ratio explained in the section <4. Generalizing knowledge in the knowledge bank> in the foregoing score S1 that indicates a generation probability of question text. For example, the two values of coverage ratio and error ratio are put into a single score by any method. For example, a score resulting from a simply averaging calculation by score=(coverage ratio+(1−error ratio))/2 is given to each set of synonyms. By multiplying the score S1 and the above score together, obtained S1*score can be used as a new indicator instead of S1.

What is claimed is:

1. An information processing method that is executed by an information processing device including an input device, an output device, a processing device, a storage device, and a generating unit, wherein the generating unit executes:

inputting multiple pieces of text data;

inputting a synonym dictionary including multiple sets of synonyms;

extracting a first piece of text data from the multiple pieces of text data;

extracting from the synonym dictionary a set of synonyms in which a certain word in the first piece of text data is included;

extracting from the multiple pieces of text data second multiple pieces of text data including a synonym belonging to the extracted set of synonyms; and generating a score to evaluate a relationship between the first piece of text data and the extracted set of synonyms from a relationship between the first piece of text data and the second multiple pieces of text data, by converting the first piece of text data and the second multiple pieces of text data to fixed-length vectors, calculating an average vector and a covariance matrix from a set of the fixed-length vectors of the second multiple pieces of text data and obtains a context distribution, calculating a generation probability of the fixed-length vector of the first piece of text data in the context distribution and obtains a first score, wherein a piece of the text data includes a pair of a question text and an answer text;

extracts a question text in a first piece of text data from the multiple pieces of text data;

extracts from the synonym dictionary a set of synonyms in which a certain word in the question text in the first piece of text data is included;

extracts from the multiple pieces of text data second multiple pieces of text data including a question text which includes a synonym belonging to the extracted set of synonyms; and generates a score to evaluate a relationship between the first piece of text data and the extracted set of synonyms from a relationship between the question text in the first piece of text data and each of question texts in the second multiple pieces of text data.

2. The information processing method according to claim 1, wherein the score is generated based on a relationship between the first piece of text data and a distribution of the second multiple pieces of text data.

3. The information processing method according to claim 1, wherein the generating unit converts the question text in the first piece of text data and question texts in the second multiple pieces of text data to fixed-length vectors;

the generating unit calculates an average vector and a covariance matrix from a set of the fixed-length vectors of question texts in the second multiple pieces of text data and obtains a context distribution; and the calculates a generation probability of the fixed-length vector of the question text in the first piece of text data in the context distribution and obtains the first score.

4. The information processing method according to claim 3, wherein the generating unit executes:

generating a modified question text in which the certain word in the question text in the first piece of text data is replaced by a synonym in the extracted set of synonyms;

searching from the multiple pieces of text data for another question text that is most similar to the modified question text and is paired with an answer text different from an answer text to the question text in the first piece of text data; and calculating a similarity degree between the modified question text and the other question text and obtains a second score.

5. The information processing method according to claim 4, wherein the generating unit generates a score to evaluate whether it is appropriate to perform synonym development in the first piece of text data using the extracted set of synonyms, regarding the first score as a positive parameter and the second score as a negative parameter.

6. The information processing method according to claim 4, wherein, if multiple synonyms exist in the set of synonyms, a maximum value of similarity degrees between each of multiple pieces of the modified question text and the other question text is set to be the second score.

7. An information processing device comprising an input device, an output device, a processing device, a storage device, and a generating unit, wherein the generating unit is configured to:

input multiple pieces of text data;

inputting a synonym dictionary including multiple sets of synonyms;

extract a first piece of text data from the multiple pieces of text data;

extract from the synonym dictionary a set of synonyms in which a certain word in the first piece of text data is included;

extract from the multiple pieces of text data second multiple pieces of text data including a synonym belonging to the extracted set of synonyms; and generate a score to evaluate a relationship between the first piece of text data and the extracted set of synonyms from a relationship between the first piece of text data and the second multiple pieces of text data, by converting the first piece of text data and the second multiple pieces of text data to fixed-length vectors, calculating an average vector and a covariance matrix from a set of the fixed-length vectors of the second multiple pieces of text data and obtains a context distribution, and calculating a generation probability of the fixed-length vector of the first piece of text data in the context distribution and obtains a first score, wherein a piece of the text data includes a pair of a question text and an answer text;

extract a question text in a first piece of text data from the multiple pieces of text data;

extract from the synonym dictionary a set of synonyms in which a certain word in the question text in the first piece of text data is included;

extract from the multiple pieces of text data second multiple pieces of text data including a question text which includes a synonym belonging to the extracted set of synonyms;

convert the question text in the first piece of text data and question texts in the second multiple pieces of text data to fixed-length vectors;

calculate an average vector and a covariance matrix from a set of the fixed-length vectors of question texts in the second multiple pieces of text data and obtains a context distribution; and calculate a generation probability of the fixed-length vector of the question text in the first piece of text data in the context distribution and obtains the first score.

8. The information processing device according to claim 7, wherein the generating unit is further configured to:

generate a modified question text in which the certain word in the question text in the first piece of text data is replaced by a synonym in the extracted set of synonyms;

search from the multiple pieces of text data for another question text that is most similar to the modified question text and is paired with an answer text different from an answer text to the question text in the first piece of text data; and calculate a similarity degree between the modified question text and the other question text and obtains a second score.

9. The information processing device according to claim 8, wherein the generating unit generates a score to evaluate whether it is appropriate to perform synonym development in the first piece of text data using the extracted set of synonyms, regarding the first score as a positive parameter and the second score as a negative parameter.

* * * * *